United States Patent
Linnell

(10) Patent No.: US 9,472,011 B2
(45) Date of Patent: Oct. 18, 2016

(54) SYSTEM AND METHOD FOR 3D PROJECTION MAPPING WITH ROBOTICALLY CONTROLLED OBJECTS

(71) Applicant: AUTOFUSS, San Francisco, CA (US)

(72) Inventor: Jeff Linnell, Woodside, CA (US)

(73) Assignee: Google Inc., Mountain View, CA (US)

( * ) Notice: Subject to any disclaimer, the term of this patent is extended or adjusted under 35 U.S.C. 154(b) by 281 days.

(21) Appl. No.: 13/678,342

(22) Filed: Nov. 15, 2012

(65) Prior Publication Data

US 2013/0120547 A1    May 16, 2013

Related U.S. Application Data

(60) Provisional application No. 61/560,744, filed on Nov. 16, 2011.

(51) Int. Cl.
*H04N 9/47* (2006.01)
*H04N 7/18* (2006.01)
(Continued)

(52) U.S. Cl.
CPC ............... *G06T 13/40* (2013.01); *B25J 9/1666* (2013.01); *B25J 9/1682* (2013.01); *B25J 11/00* (2013.01); *H04N 7/18* (2013.01); *H04N 9/3185* (2013.01); *H04N 13/0459* (2013.01); *H04N 13/0493* (2013.01); *H04N 13/0497* (2013.01); *B25J 9/1671* (2013.01); *G05B 2219/39109* (2013.01); *H04N 5/2224* (2013.01)

(58) Field of Classification Search
USPC ...... 348/61, 42, 44, 47, 48, 50, 51, 56, 135, 348/136, 333.1, 383, 744, 745; 345/156, 345/419, 652, 663, 678; 353/11, 48
See application file for complete search history.

(56) References Cited

U.S. PATENT DOCUMENTS 5,255,096 A   10/1993  Boyle
5,403,140 A    4/1995  Carmichael et al.
(Continued)

FOREIGN PATENT DOCUMENTS

JP   2008-085641 A   4/2008
JP   2009-147480 A   7/2009
(Continued)

OTHER PUBLICATIONS

International Search Report and Written Opinion mailed on Feb. 27, 2013 for International Patent Application No. PCT/US2012/065116, filed Nov. 14, 2012, 11 pages.
(Continued)

*Primary Examiner* — Jefferey Harold
*Assistant Examiner* — Mustafizur Rahman
(74) *Attorney, Agent, or Firm* — McDonnell Boehnen Hulbert & Berghoff LLP

(57) ABSTRACT

A system for motion control is presented. In one embodiment, a motion control 3D projection system includes a projector; and a projection surface coupled to a robotic arm, where the robotic arm moves the projection surface through a set of spatial coordinates, and a 3D projection from the projector is projected onto a set of coordinates of the projection surface and matches the 3D projection to the set of coordinates of the projection surface as the projection surface moves through the set of spatial coordinates. In additional embodiments, a master control system may integrate additional robotic arms and other devices to create a motion control scene with a master timeline.

20 Claims, 25 Drawing Sheets

(51) Int. Cl.
  *G06T 13/40* (2011.01)
  *H04N 9/31* (2006.01)
  *H04N 13/04* (2006.01)
  *B25J 11/00* (2006.01)
  *B25J 9/16* (2006.01)
  *H04N 5/222* (2006.01)

(56) References Cited

U.S. PATENT DOCUMENTS

| | | | |
|---|---|---|---|
| 5,581,276 A * | 12/1996 | Cipolla et al. | 345/156 |
| 5,737,500 A | 4/1998 | Seraji et al. | |
| 5,889,924 A | 3/1999 | Okabayashi et al. | |
| 7,071,462 B2 * | 7/2006 | Young | G01J 5/0022 250/252.1 |
| 8,180,477 B2 * | 5/2012 | Mori | G05B 19/406 345/420 |
| 8,437,535 B2 * | 5/2013 | Boca | G01B 11/25 382/154 |
| 8,693,787 B2 * | 4/2014 | Kim | G06K 9/00449 382/206 |
| 2003/0085891 A1 * | 5/2003 | Lyons et al. | 345/420 |
| 2004/0105573 A1 | 6/2004 | Neumann et al. | |
| 2006/0083440 A1 * | 4/2006 | Chen | H04N 5/23238 382/284 |
| 2007/0171380 A1 * | 7/2007 | Wright et al. | 353/69 |
| 2007/0222747 A1 | 9/2007 | Kritt et al. | |
| 2007/0291185 A1 * | 12/2007 | Gelb et al. | 348/745 |
| 2008/0011904 A1 | 1/2008 | Cepollina et al. | |
| 2008/0018732 A1 * | 1/2008 | Moller | 348/51 |
| 2008/0137756 A1 | 6/2008 | Scherlis et al. | |
| 2008/0152082 A1 * | 6/2008 | Bouchard | G01N 23/04 378/57 |
| 2008/0235970 A1 | 10/2008 | Crampton | |
| 2009/0132088 A1 * | 5/2009 | Taitler | G05B 19/42 700/264 |
| 2009/0213213 A1 * | 8/2009 | Fright et al. | 348/77 |
| 2009/0284714 A1 | 11/2009 | Kogo et al. | |
| 2009/0310088 A1 | 12/2009 | Jung et al. | |
| 2010/0018339 A1 * | 1/2010 | Aiken | 74/490.01 |
| 2010/0074532 A1 * | 3/2010 | Gordon et al. | 382/203 |
| 2010/0090948 A1 * | 4/2010 | Oba et al. | 345/156 |
| 2010/0123687 A1 | 5/2010 | Nagamine | |
| 2010/0165188 A1 | 7/2010 | Jannard | |
| 2010/0217528 A1 | 8/2010 | Sato et al. | |
| 2010/0227527 A1 | 9/2010 | Smoot et al. | |
| 2010/0275719 A1 * | 11/2010 | Ortmaier | A61B 19/2203 74/490.01 |
| 2011/0050872 A1 | 3/2011 | Harbert et al. | |
| 2011/0058023 A1 | 3/2011 | Boles et al. | |
| 2011/0064388 A1 * | 3/2011 | Brown | G06T 13/20 386/285 |
| 2011/0134225 A1 * | 6/2011 | Saint-Pierre et al. | 348/47 |
| 2011/0172822 A1 | 7/2011 | Ziegler et al. | |
| 2011/0210908 A1 * | 9/2011 | Kasuya | G06F 3/038 345/2.2 |
| 2011/0221773 A1 * | 9/2011 | Kasuya | G06Q 10/10 345/634 |
| 2012/0038739 A1 * | 2/2012 | Welch | G06T 15/04 348/14.01 |
| 2013/0120547 A1 | 5/2013 | Linnell | |
| 2013/0218340 A1 | 8/2013 | Hager | |

FOREIGN PATENT DOCUMENTS

| | | |
|---|---|---|
| JP | 2009-216958 A | 9/2009 |
| JP | 2011-254411 A | 12/2011 |
| KR | 10-2011-0061548 A | 6/2011 |
| WO | 2010/102288 | 9/2010 |
| WO | 2010102288 A2 | 9/2010 |

OTHER PUBLICATIONS

Pachoud, "Video mapping on moving objects, test 2," Sep. 12, 2010, XP0555196128.
Pachoud, "Explore Features Enterprise Blog," Sep. 12, 2010, XP055196141.
Dynamic 3d mapping test with arduino and vvvv by sapobs, Jan. 29, 2010, XP054975915.
Kudo et al., "Multi-arm robot control system for manipulation of flexible materials in sewing operation," Mechatronics, vol. 10, Apr. 1, 2000, pp. 371-402.
Shaffer, "Real-time robot arm collision detection for telerobotics," Computer & Electrical Engineering, vol. 17, No. 3, Jan. 1, 1991, pp. 205-215.
Supplementary European Search Report for EP 12 84 9815 dated Jun. 19, 2015.

* cited by examiner

SYSTEM AND METHOD FOR 3D PROJECTION MAPPING WITH ROBOTICALLY CONTROLLED OBJECTS

CROSS-REFERENCE TO RELATED APPLICATION

This application is a non-provisional application of U.S. Provisional Patent Application No. 61/560,744, filed Nov. 16, 2011, entitled "System and Method for 3D Projection Mapping with Robotically Controlled Objects", and is incorporated by reference herein in its entirety for any and all purposes.

BACKGROUND

Embodiments of the present invention relate to the use of automated systems and controls in the creation of audiovisual presentations. More specifically, embodiments of the invention relate to systems and methods of using a projection mapping with robotic motion control.

3D projection mapping is a technique to create the illusion of objects and environments where they don't physically exist. By projecting light on a surface that is rendered from a specific perspective the viewer perceives an environment that is not actually physically present.

Motion control is a type of automation, where the position of an object or objects is controlled using some type of device such as a robotic arm. In the production of videos, films, commercials, movies, and other such audiovisual works, the placement and movement of the camera and objects in a scene being captured by the camera is a major consideration and source of time and expense. The use of motion control is known in the film industry, where a camera is mounted and controlled as part of the creation and recording of a video scene. This technique is commonly referred to as motion control photography.

SUMMARY

Various embodiments of motion control systems are presented. In one potential embodiment, a 3D projection surface is matched with a projector. Either or both items may be mounted on robotic arms which function as device actors for a scene that is set to vary over time and space, with the device actor moving the projection surface and the projector presenting a projected image onto the projection surface. In one embodiment, this enable motion control of a scene actor that is partially mechanically animated using the device actor and partially computer animated using the projection from the projector.

DETAILED DESCRIPTION

Embodiments of the innovations disclosed herein include systems and methods for providing enhanced motion control with three dimensional (3D) projection mapping. In particular, systems and methods describe a system with a three dimensional projection surface attached to a controllable robotic arm, a projector for projecting an animated projection onto the 3D projection surface, and an attached system for synchronizing movement of the 3D projection with projection from the projector onto the 3D projection surface.

One potential embodiment is used in the field of animatronics, or creating animated robots that appear lifelike. In such an embodiment, a projection surface is shaped in the form of a represented creature such as a dinosaur, a monkey, or some other creature. Certain portions of the creature is difficult to create using physical mechanical devices Facial features such as eyes and lips, in particular, have historically be difficult to recreate mechanically. One or more projectors is positioned with an optical path from the projector to all or part of the projection surface, and an animated projection of eyes and a mouth is projected onto the projection surface. The projection surface is then be moved to imitate walking, head movement, or other characteristic movement of the creature being simulated. As this movement of the projections surface occurs, the projection of eyes and a mouth matches the movement of the projection surface, so the position of the eyes and mouth remain relatively stationary on the projection surface, while the illusions of blinking eyes and mouth moment occurs. If such a system includes sufficiently powerful computer animation software, the motion of the projected features is controlled real-time to, for example, match mouth movements to sounds being created which enables non-scripted conversation with the animatronic robot.

Further, some embodiments of such a projection system include multiple projection surfaces, multiple projectors, and additional system devices such as sound, ambient lighting, and other such effects that is integrated into a master control system to enable forward and reverse motion through a series of scripted and synchronized sets and a controllable rate. Additional embodiments further include integrated safety features for preventing collisions between devices or persons operating within an area where the devices are moving.

Figure 1:
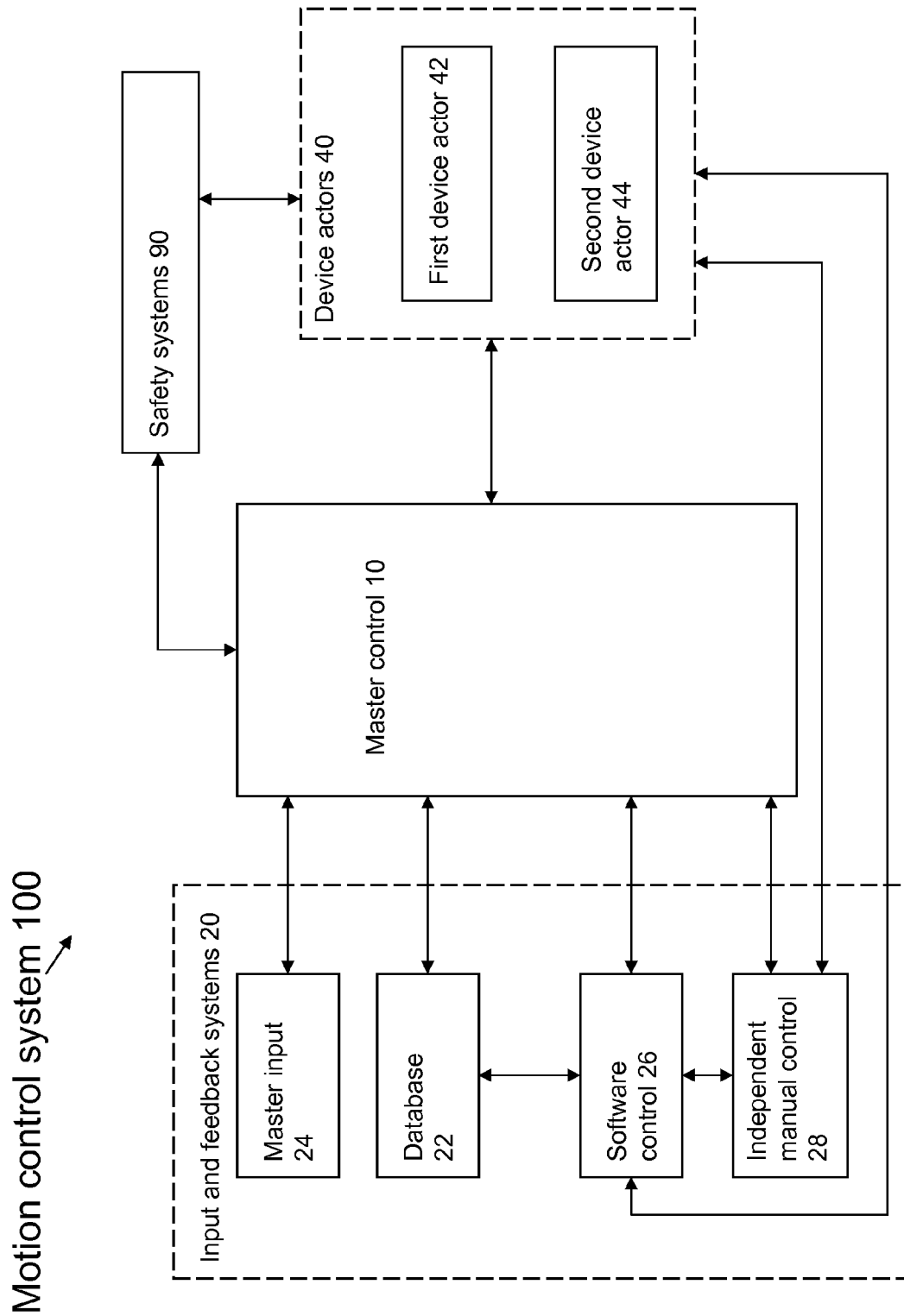
FIG. 1 shows a block diagram of a motion control photography system including a master scene control according to one embodiment of the innovations herein.

FIG. 1 describes a motion control system 100 Motion control system 100 is part of a motion controlled set used to film a scene using motion control photography. Motion control system comprises a master control 10, input and feedback systems 20, device actors 40, and safety systems 90. From the most basic perspective, motion control system 100 functions when an input system 20 provides instructions to a device actor 40 via master control 10.

For the purposes of the present invention, a scene comprises a set of motions and actions by device actors 40 over a continuous period of time, such that a set of players in front of a camera is recorded in video, sound, or both. The players are people, stationary objects, or objects controlled or moved by one or more devices of device actors 40. In one embodiment, the camera is mounted to a robot arm of device actors 40. At a beginning of a scene, a camera and a plurality of players begin in a first position. Motion control of device actors 40 moves the camera and the players through a sequence of motions to the end of a scene, with players and sound from the scene recorded using the camera and potentially other audio and video recording equipment to capture the motion.

In one potential embodiment as part of a motion control system 100, input and feedback systems 20 include a database 22, a master input 24, a software control 26, and an independent manual control 28. As part of the input and feedback systems 20, database 22 operates to provide a set of timing and position data to direct all or a portion of device actors 40. Alternatively, database 22 stores data being created by manual or individual movement or data input related to operation and function of device actors 40. Database 22 also stores data created independently of device actors 40, such as data created using software modeling features of a software control 26.

A master input 24 is any device that functions to operate all of the device actors 40 associated with a particular scene being created with motion control system 100. Master input 24 functions by sending input control signals to master control 10. Master control 10 then adapts the signal from master input 24 to send individual control signals to a plurality of actors operating as device actors 40 for the particular scene. In one potential embodiment, every individual device of device actors 40 is provided a control signal from master control 10 when a signal is received from master input 24, including a signal to maintain a status quo or non-action to devices that are not operating as device actors 40 for a particular scene. In an alternative embodiment, a portion of the device actors connected as part of motion control system 100 are not sent any signal from master control 10 as part of the operation of motion control system 100 for a particular scene.

Software control 26 acts as a replacement for master input 24 in sending control signals to the plurality of actors via the master control 10. Alternately, software control 26 controls individual devices from among device actors 40 to alternate, change, or experiment with motions of the individual device. In other potential embodiments, software control 26 functions to model the behavior of individual devices of device actors 40 within a virtual environment. In such an embodiment, software control 26 contains a software model for an individual device, which allows control signals to be created for the device without actually sending the control signals to the device. The control signals are then be stored in the software control 26, in database 22, within a computer memory component that is part of master control 10, or within computer memory that is part of the device of device actors 40 for which the controls are being created. After the control signal is created by software control 26 and propagated to the appropriate storage location, a master control signal from software control 26 or from master input 24 activates the control signal for the individual device to act in conjunction with other device actors 40.

Certain devices of device actors 40 additionally have an independent manual control 28. As described above with respect to software control 26, control signals for an individual device are created in software modeling. Similarly, a device may have independent manual control 28 that is used to operate a device of device actors 40. For example, in one potential embodiment, a device that is one of device actors 40 is a follow focus that controls the focus of a camera. The follow focus may have a control device that is designed to control the focus of the camera that may operate as an independent manual control. When a set of instructions is being created for the entire scene, the independent manual control 28 is given input commands over time that are recorded to database 22 or a memory device of master control 10. During creation of a set of instructions using independent manual control 28, the independent manual control 28 may communicate directly with the associated device of device actors 40. Alternatively, the independent manual control 28 may send the control signal to master control 10, which then conveys the signal to the associated device of device actors 40. The control signal may then be created either from the signal of the independent manual control 28, of from a measured feedback reading created by the operation of the associated device. Additionally, although in many situations it is preferable to have the independent manual control 28 actually control the associated device during control signal creation in order to view the results, control signals is created without controlling the device. For example, if expected input signals are expected for certain time marks, an independent manual control 28 is operated independent of the related device, and the control operation recorded. These function as ways in which instructions for individual device actors of device actors 40 is integrated into a motion controlled scene as part of motion control system 100.

The result of the integration described above is considered as a global timeline for a motion controlled scene. FIG. 5b, described in more detail below, provides an illustrated example, where the actions of multiple motion controlled actors are integrated into a global timeline using a master control. In FIG. 5b, various actors such as camera and lighting robots move at certain points during a scene. The actors is receiving control signals during the entire scene from time a to time f, or may only receive controls when they actually move or act. Certain other actors, such as $1^{st}$ and $2^{nd}$ special effects (fx) actors only receive single commands to act at one specific time, such as $1^{st}$ fx actor acting at time b in the global timeline of FIG. 5b. Such an integration into a global timeline allows simplified user control of complex actions impacting an entire scene that may save significant amounts of time in modifying a particular scene with a given timeline. This allows scrubbing through time forward and backwards as well as seeking to specific frame number or timecode for all actors in a particular scene, and slowing down or speeding up the performance of the entire set (system) in real time via hardware device Although embodiments will be illustrated with reference to specific implementations, a person of ordinary skill in the art will understand that these implementations describe innovations which may have broad use other than the specifically described implementations. As described below, enhanced control may comprise systems and methods for a variety of functions, including safety systems, playback speed control, forward and reverse position scrubbing, and integrated detection systems, among others.

Such a system includes advantages over systems currently known in the art by providing accessible and highly sophisticated robotic controls in an art environment dominated by custom toolsets without simple or malleable integration toolsets. Such a use of highly accurate control systems with cameras is considered, in certain embodiments, to be "cinematic automation" or "3D projection automation" which allows the ambitions of visual story tellers to be matched through the application of automation systems. For example, improved control systems can coordinate sub-millimeter position of a camera in space with the position of the light, an actress, a robotic actor comprising a 3D projection surface, and special effects (pyrotechnics, video playback, sound cues, etc.). This allows execution of highly complex shots that would previously have required the coordination of several film departments with manual human positioning. Such control systems remove inaccuracy and introduced the repeatability of robotics, through highly accurate computer synchronization of events. In addition to developing a faster, more rigid, safer, and easier to program robotic arm system, embodiments of the present innovations include interfaces that allow a creative director to make very quick on-set adjustments. In the high pressure environment of feature films and commercial productions, it is critical that a director or visual effects supervisor is able to make very quick creative or technical calls, and the systems described herein enable this in a way not known in the previous art.

As a further example, if a system implementation of the innovations is being used in presentation of a scene in a live play, the system might be synchronizing a large robotic arm, a custom robotic rig to move the arm, video playback of a wall of LED's that serve as the light source, and the motion of a piece of background, and an animatronic actor with facial features animated from a projector attached to an animation computer with arm and leg movement animated by robotics. This is a highly technical, pre-programmed scene that has been pre-visualized in a computer, and the interplay of all the elements have been choreographed using the system. Real time during the play, if the actors are delivering their lines at a slower than normal rate, or there is a need to pause for extra applause, a play director may compensate real time by pausing the entire set or by simply turning a knob at the right moment to accommodate the actors. The robot slows down, the robotic rig complies, and the entire scene of the play decelerates. All of this happens in synchronicity. Plus the system can provide integrated enhanced safety to prevent the actors from being injured.

Figure 2:
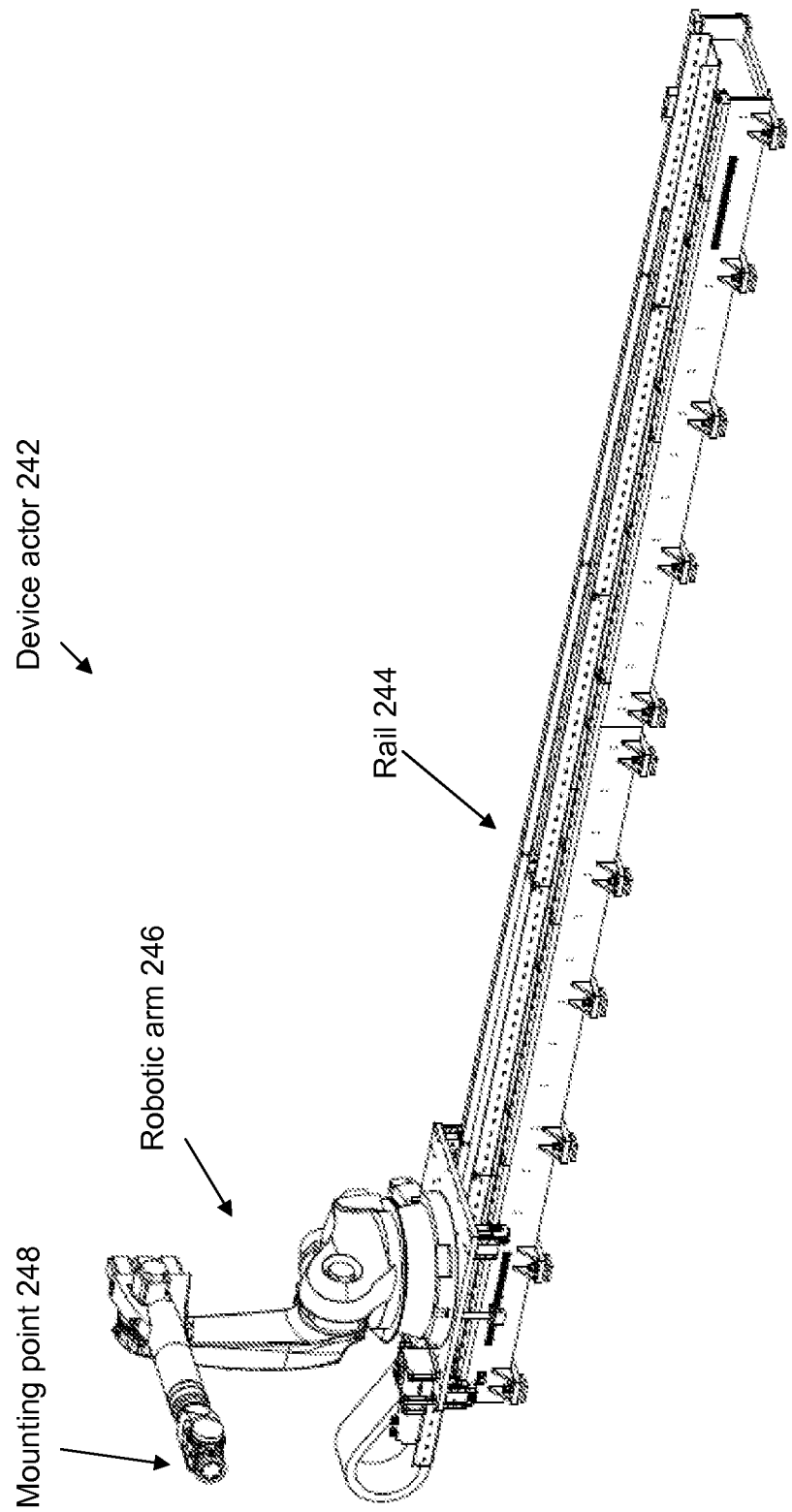
FIG. 2 shows a perspective view of a robot for use with a motion control photography system according to one embodiment of the innovations herein.

Referring now to FIGS. 2-4, several non-limiting examples of device actors 40 will be described. Although these figures focus on the use of robotic arms, device actors is other types of devices that is stationary, such as sensors, stationary lights, and signal sources, as will be described later.

FIG. 2 describes device actor 242. Device actor 242 comprises robotic arm 246, mounting point 248, and rail 244. Device actor 242 is described in FIG. 2 with no specific functionality attached at any mounting point such as mounting point 248. Mounting point 248 is configured to hold a camera, a light, a player that will be filmed by a camera, or any other relevant device or object. In certain embodiments, instructions is given to position mounting point 248 at a specific location, and the positions of the axis of robotic arm 246 and of rail 244 is calculated by a process of the related motion control system. In alternative embodiments, each axis of robotic arm 246 and the position of rail 244 require separate, individual settings and control commands.

Figure 3A:
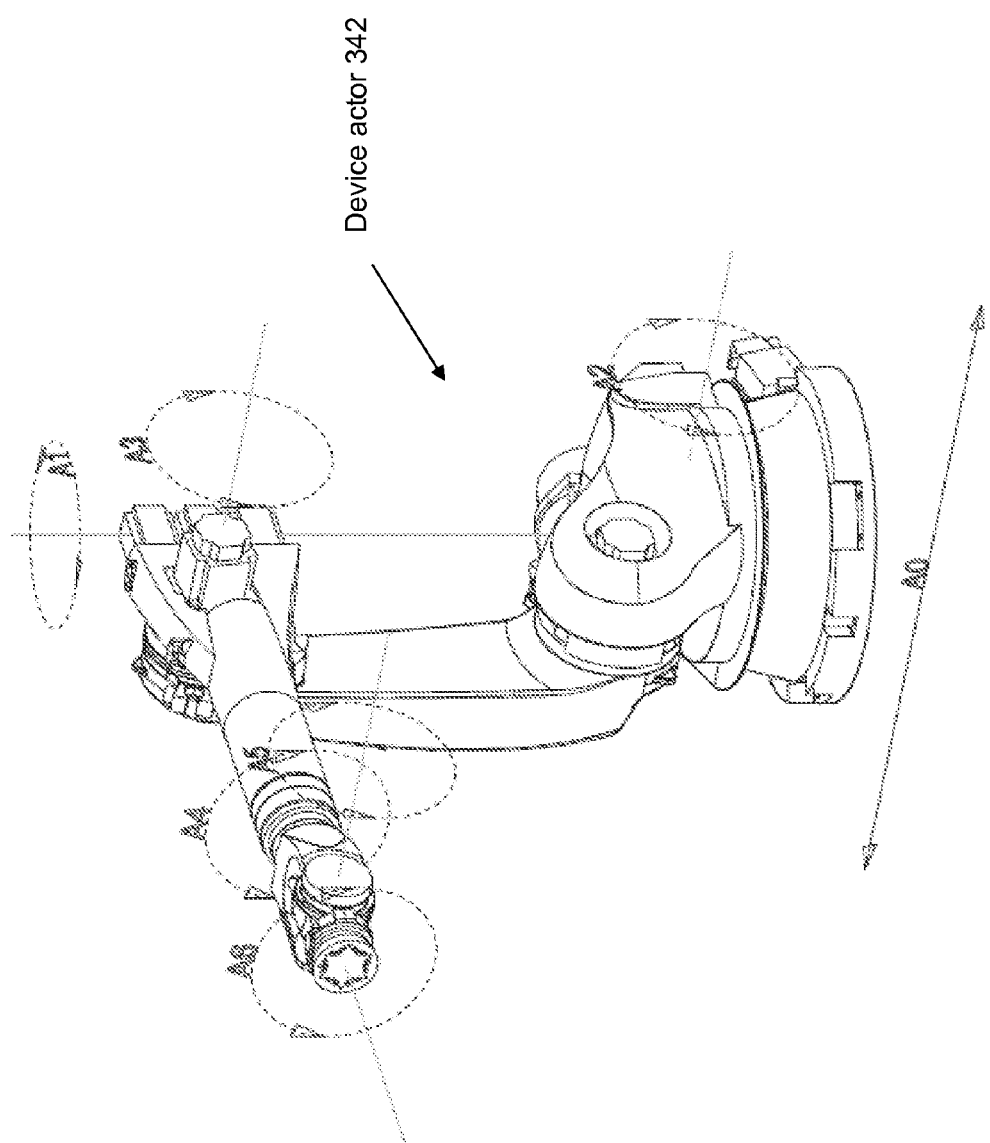
FIG. 3a shows a view of a robot with 7 degrees of freedom according to one embodiment of the innovations herein.
Figure 3B:
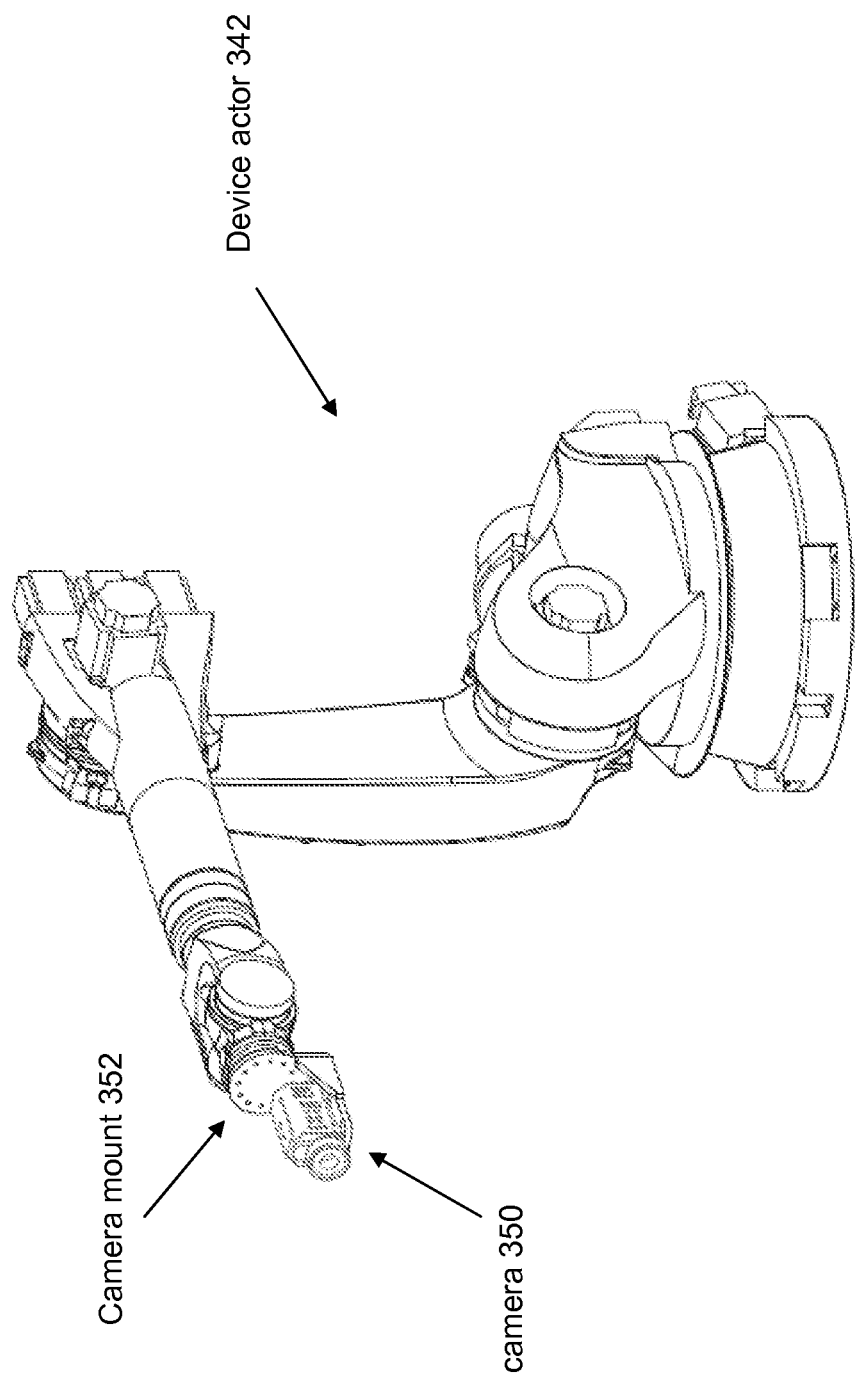
FIG. 3b shows a view of a robot with an attached camera according to one embodiment of the innovations herein.
Figure 3C:
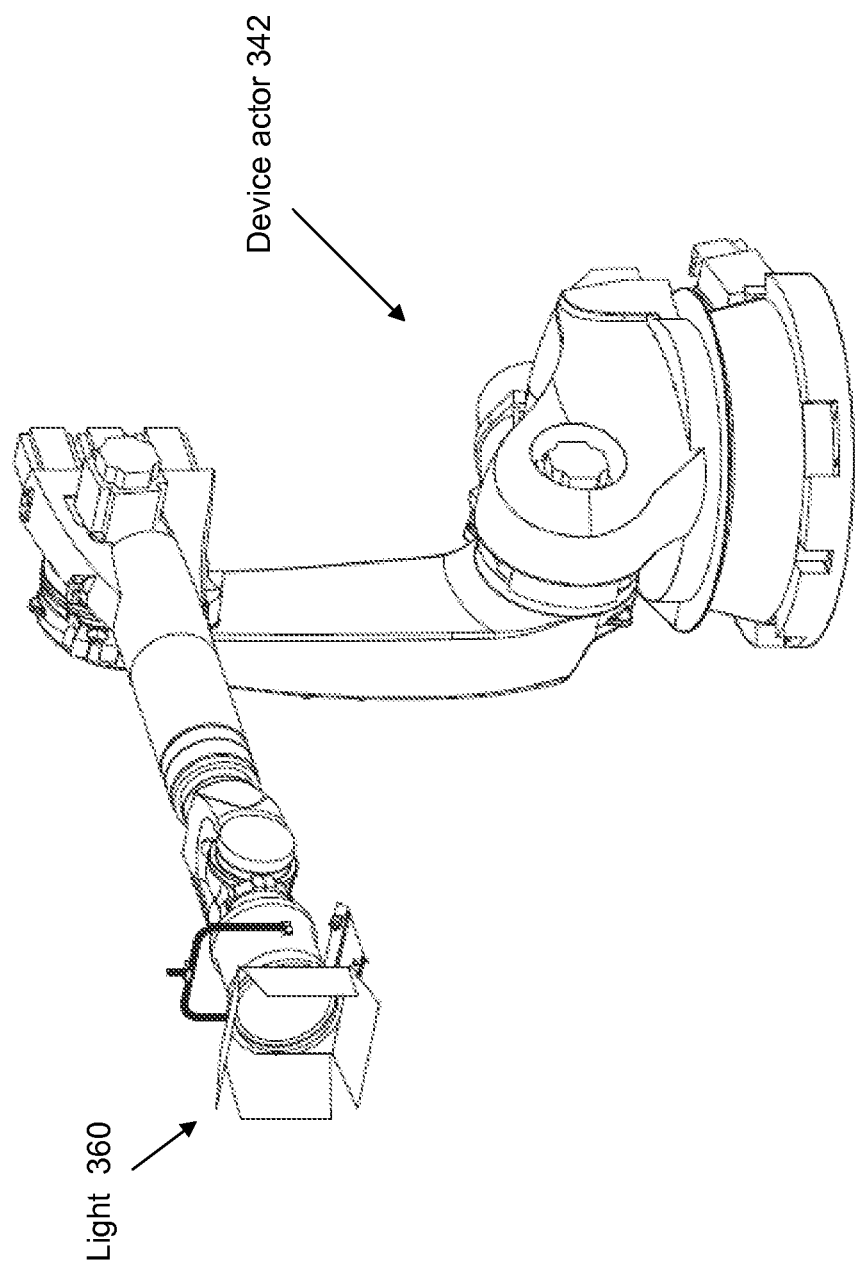
FIG. 3c shows a view of a robot with an attached lighting unit according to one embodiment of the innovations herein.

FIG. 3a describes device actor 342, comprising a robotic arm with axis A1-A6, with axis A0 associated with a rail which is not shown that allows side to side movement of the other eight axes. FIG. 3b describes device actor 342 with a camera mount 352 placed at a mounting point, and camera 350 attached to camera mount 352. FIG. 3c describes device actor 342 with light 360 placed at a mounting point.

Figure 4B:
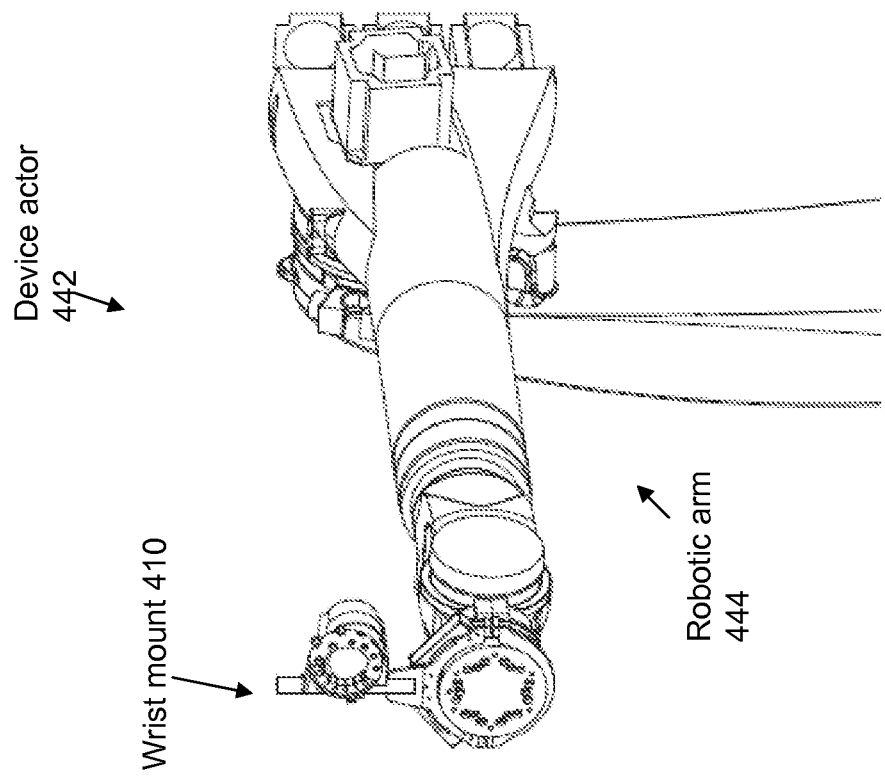
FIG. 4b shows a view of a robot with an attached wrist mount according to one embodiment of the innovations herein.
Figure 4A:
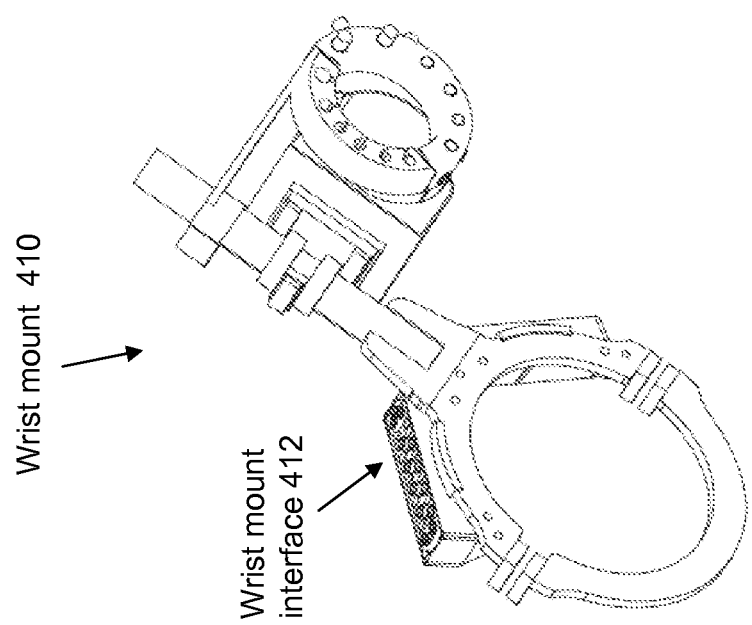
FIG. 4a shows a view of wrist mount for use with a robotic arm in accordance with one embodiment of the innovations herein.

FIGS. 4a and 4b describe an embodiment where a device actor 442 comprises a robotic arm 444 with a wrist mount 410 and a wrist mount interface 412. Wrist mount 410 and wrist mount interface 412 enables multiple device actors to be mounted to robotic arm 444 in addition to standard mounts such as a camera or lighting fixture. In certain embodiments, the wrist mount interface enables temperature sensors, laser range detectors, microphones, speakers, fans, or other mechanical activated or special effects devices.

Figure 5A:
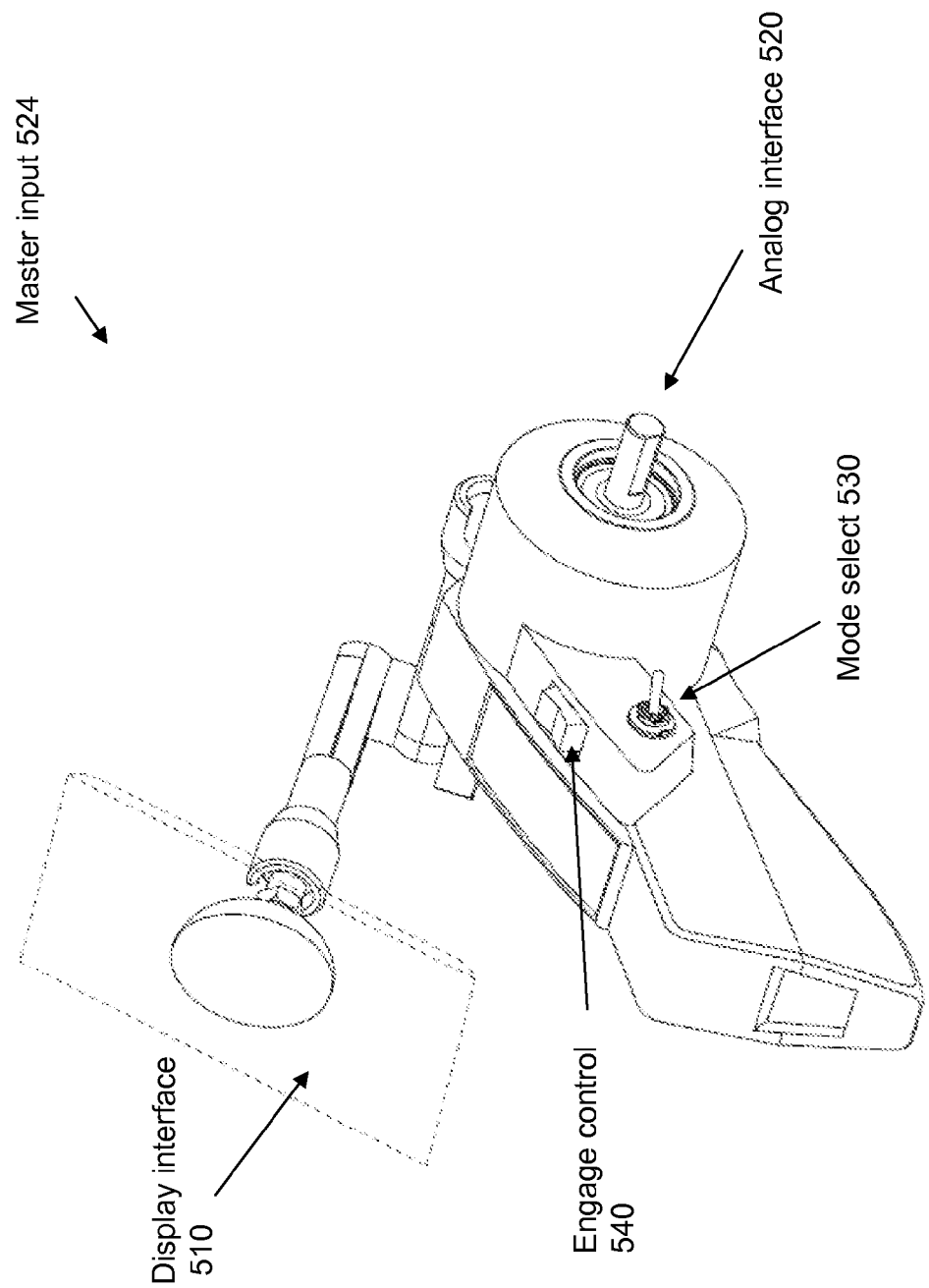
FIG. 5a shows one potential embodiment of a master input for use with a motion control system according to one embodiment of the innovations herein.
Figure 5B:
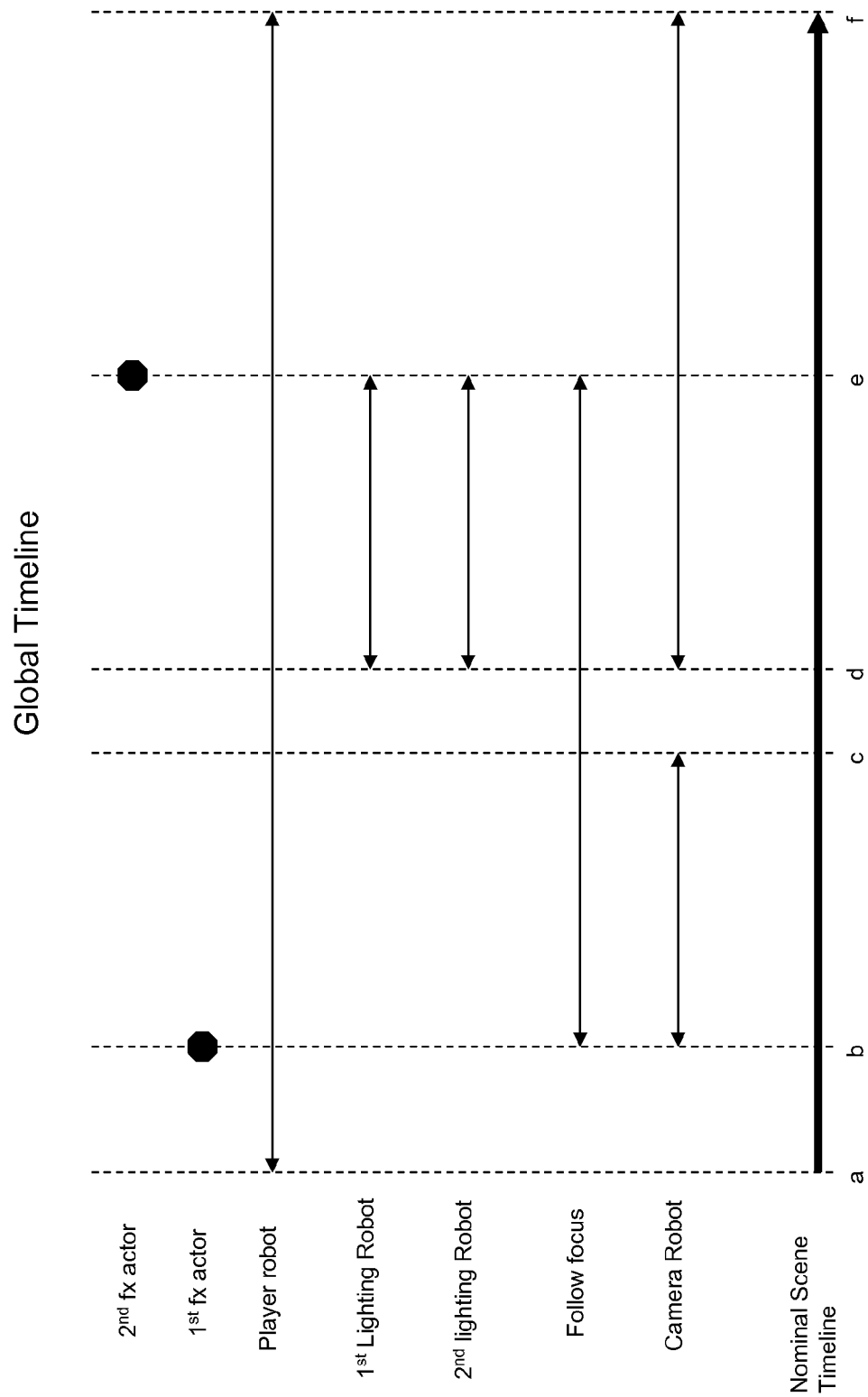
FIG. 5b illustrates a global timeline coordinating device actor positions through a master control according to one embodiment of the innovations herein.

FIG. 5a describes master input 524 which is one potential implementation of a master input such as master input 24 of FIG. 1. Master input 524 comprises a display interface 510, and engage control 540, a mode select 530, and an analog interface 520. The function of master input 524 will be described in conjunction with the global timeline of FIG. 5b.

FIG. 5b illustrates a global timeline associated with one potential embodiment of a motion controlled scene implemented in a motion control system such as motion control system 100 of FIG. 1. FIG. 5b includes a number of actors, as defined above, which operate during a scene with a nominal or standard running time from time a to time f. The global timeline is nominal and not referring to real clock time because, as will be detailed further below, master input controls alters the rate at which actors progress through motions from the beginning of a scene to the end of a scene. The global timeline may therefore alternately be thought of as a coordinated position chart for actors. During the scene running time, an actor may act or move during the entire scene, during a portion of the scene, or only for one instant of a scene. Each actor, though, will have a predetermined point for each nominal time from the beginning to the end of the scene. The predetermined points for each actor are associated with predetermined points for each other actor.

In one potential embodiment, individual control signals for specific device actors are coordinated into a single file within a memory of a master control with a common base time provided by a master clock within the master control. During operation, master control extracts control signals for each device actor and provides individual control signals to each device actor at the appropriate intervals. In an alternative embodiment, a master control maintains separate individual control signal files and timing data for different device actors, and synchronizes the different control signals separately from the individual control files.

In another alternative embodiment, the control data for a portion of the device actors is transferred by a master control to a memory within an associated individual device actor. During operation, device actors having control data within memory receive only a synchronization signal that indicates a location in a global timeline, a rate of progress through a global timeline, or both.

The specific embodiment described in FIG. 5b includes a camera robot, a follow focus, two lighting robots, a player robot that controls an object that is to appear in front of a camera, and two special effects actors. As described above, each actor has a path to follow through the scene from beginning at time a to end at time f. In the specific embodiment of FIG. 5b, each actor begins at a preset position. As described by the global timeline, only the player robot moves from time a to time b. This will be true whether b occurs 10 seconds after starting time a, or 20 seconds after time a due to modification of the rate at which the scene progresses by a master input, as is further detailed below. At time b, $1^{st}$ special effects actor is activated with a single command, player robot continues moving, and follow focus and camera robot begin moving.

The chart of FIG. 5b is not meant to indicate that non-moving actors such as $1^{st}$ lighting robot, $2^{nd}$ lighting robot, and $2^{nd}$ fx actor during time a to time b are not receiving input commands. FIG. 5b merely illustrates a global position timeline. In certain embodiments they may not be receiving input commands from a master control. In alternative embodiments, however, non-moving actors such as $1^{st}$ lighting robot may periodically or continuously receive commands from a master control, even when not moving, where the command is an instruction not to move. Such a command may function to maintain synchronization, acting as a clock or a timing heartbeat to maintain synchronization. In some embodiments, real time adjustments are made to an actor during a scene. Such a clock or timing heartbeat further serves to provide synchronization data as the adjustments feed back to the master control to update and change the global timeline.

Referring back to FIG. 5a, master input 524 includes a display interface 510. Display interface 510 is a modular touch screen device that displays status information related to actors or the global timeline. For example, display interface 510 includes a scene time associated with the current position of the actors in the global timeline, or a frame number for a current scene associated with the current timeline. In such a display, time a, for example, or frame 1, is displayed when the actors are in position for the beginning of the scene. In one potential embodiment, display interface 510 is a portable electronic device or a cellular telephone with an interface application that communicates with a master control.

Master input 524 additionally comprises an engage control 540. Because of the size and force that many actors, particularly large industrial robot arms carrying heavy cameras moving at up to several meters per second, are capable of conveying in a collision, safety controls is extremely important for many embodiments of a motion controlled scene. Engage control 540 acts as an input regulator to prevent master input 524 from being operated by accident, such that engage control must be depressed at all times prior to any other input command being conveyed and acted upon from master input 524.

As shown in FIG. 5a, master input 524 also comprises a mode select 530 and an analog interface 520. Analog interface 520 is any input device capable of defining a range of inputs by a user control. In one potential embodiment, analog interface 520 is a wheel with a spring action that returns the wheel to a central position in the absence of user manipulation. In other potential embodiments, analog interface is a lever, a sliding tab, or any other input control to enable a user to input a signal. Master input 524 may comprise multiple input modes. In one potential embodiment, master input 524 comprise a reset mode, a play mode, and a scan mode, with the mode selectable via mode select 530.

In a reset mode, operation of engage control 540 and analog interface 520 operates to cause each actor within a scene to move to an initial position for the beginning of a global timeline. Additionally, a specific scene or frame number is selected by use of display interface 510, and operation causes each actor to move to a position associated with that frame or time in the global timeline. Such a mode may allow device actors that are out of position for a particular time to be reset to a correct position.

In a play mode, operation of analog interface 520 may serve to speed up or slow down progress through a scene in a global timeline. For example, in a scene with actors set in position at global time a, selecting engage control 540 may serve to begin the action of all actors through the global timeline at a base rate, where each second of time is associated with one second of progress through the global timeline. Operation of analog interface 520 in a first direction then serves to slow down progress through the global timeline, such that 1 second of real time is associated with 0.5 seconds of progress through the global timeline. If the analog interface 520 is then set back to center, the progress through the global timeline will revert to a one to one ration with real time, but with the remaining actions being delayed from the initial start by the previous slowdown. Conversely, if analog interface 520 is operated in a second direction opposite from the first direction, progress through the global timeline is increased. If, for example, the nominal time from time a to time b is 10 seconds, increasing progress through the global timeline by 10% may reduce that actual time required for the motion controlled scene to progress from the positions of time a to the positions of time b by approximately 0.9 seconds and the actual time required the progress from time a to time b with analog interface set to increase playback being approximately 9.1 seconds. This may provide use when a human player being recorded by a camera as part of a motion controlled scene is delivering lines more slowly or more quickly than expected, and there is a desire to match the actions of the motion controlled scenes with the actions of human players that are not motion controlled.

In a scan mode, selecting the engage control 540 and then operating analog interface 520 may operate to shuttle or scan forwards or backwards through the global timeline in a continuous fashion. For example, if a motion controlled set currently has actors in positions associated with time c, selecting shuttle mode and operating analog interface 520 in a first direction may cause all actors to move continuously forward through the positions associated with the global timeline to reach time d. Moving analog interface 520 in a second direction may cause all actors to move continuously backwards through the positions associated with the global timeline to reach the positions associated with time b. In one potential embodiment, a particular time or frame is selected using display interface 510. Operation of analog interface 520 may shuttle continuously through the positions of the global timeline until the particular time or frame is reached. Master input 524 may then cease to control device actors until a selection in display interface 510 is activated acknowledging that the previously selected point has been reached, or until analog interface 520 is returned to a central position.

Figure 6A:
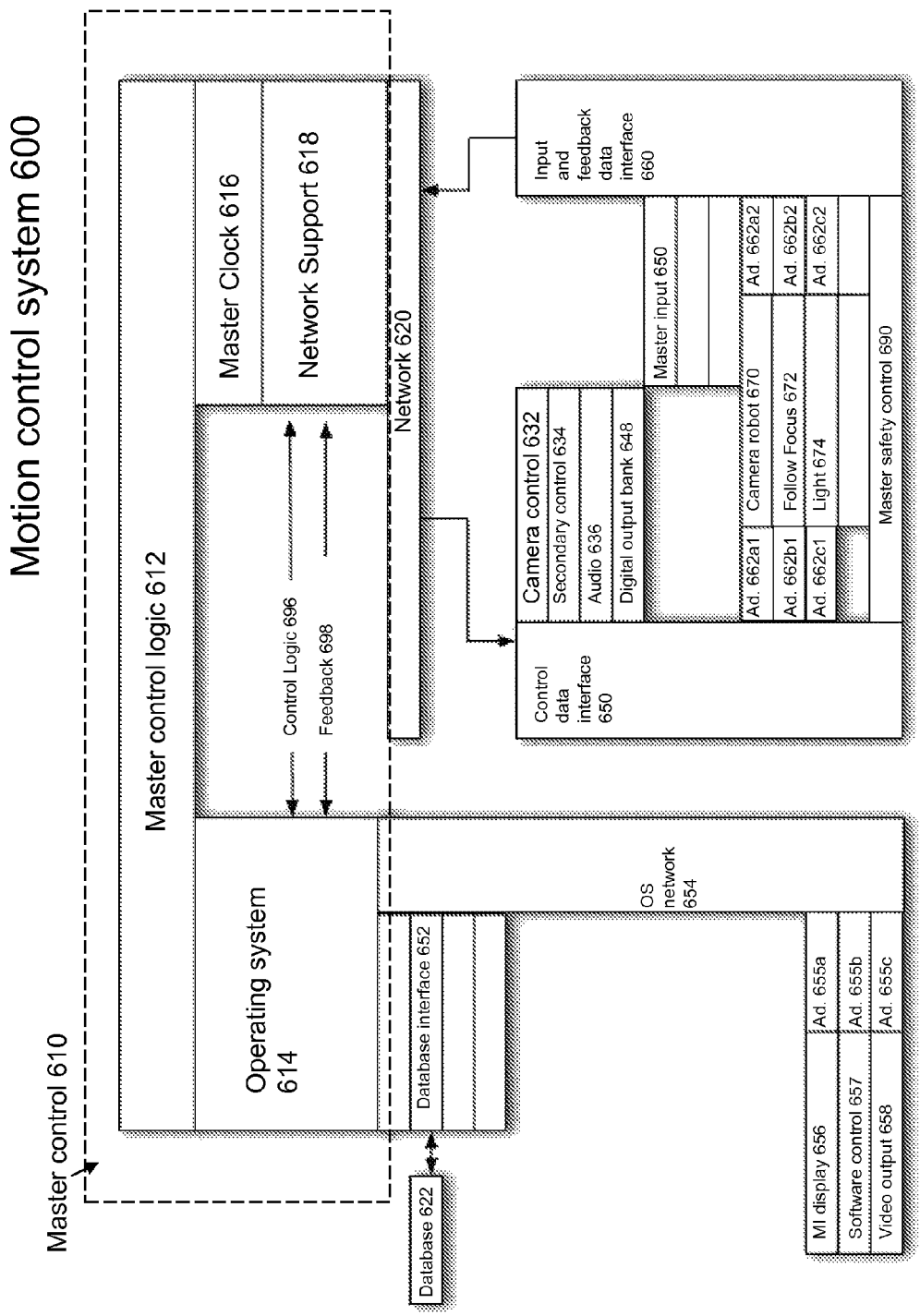
FIG. 6a shows a block diagram of a motion control photography system including a master scene control according to one embodiment of the innovations herein.

FIG. 6a describes a block diagram of a motion control system 600. Motion control system 600 comprises a master control 610, as well as details of one potential embodiment of input, feedback, and device actor sub-systems. In the embodiment disclosed by motion control system 600, master control 610 comprises an operating system 614, master control logic 612, master clock 616, network support 618, control logic 696, and feedback 698. The elements of master control 610 are implemented in a computer system comprising a general function processor and memory hardware system. Alternatively, master control 610 is implemented in custom designed processing, memory, and networking hardware devices, or is implemented in an abstracted software layer of a general purpose computing system. Master clock 616 functions as a real time clock to coordinate movement of the actors in the system. Master control logic 612 functions to integrate the individual control signals into a master timeline, and to correctly route control signals to the correct device, both during operation of the entire motion control scene through the master timeline, and through individual modification and setting of device actor positioning and function using control logic 696. Master control logic 612 also assists in coordination and routing of feedback 698. Feedback 698 may include actual position and setting signals received from monitors attached to device actors. One potential example is a location device attached to a robot arm. The actual position of the arm is tracked via the location device to provide feedback and calibration in relation to an input position command sent to the arm from either database 622, software control 657, or another control input for the robot arm. Operating system 614 includes special libraries and functionality for interacting with device actors, and may further serve to manage basic hardware computing functionality such as memory storage and processor usage. Operating system 614 may further enable networking capability via OS network 654 to communicate with various related devices.

Network support 618 may also enable communications from master control 610 to related devices, actors, and input controls via network 620. In one potential embodiment, network 620 may comprise an EtherCAT network operating according to IEEE 1588. In such an embodiment, packets are no longer received, then interpreted and copied as process data at every connection. Instead, the frame is processed on the fly using a field bus memory management unit in each slave node. Each network node reads the data addressed to it, while the telegram is forwarded to the next device. Similarly, input data is inserted while the telegram passes through. The telegrams are only delayed by a few nanoseconds. On the master side commercially available standard network interface cards or on board Ethernet controller can be as hardware interface. The common feature of these interfaces is data transfer to the master control via direct memory access with no CPU capacity is taken up for the network access. The EtherCAT protocol uses an officially assigned Ether Type inside the Ethernet Frame. The use of this Ether Type allows transport of control data directly within the Ethernet frame without redefining the standard Ethernet frame. The frame may consist of several sub-telegrams, each serving a particular memory area of the logical process images that can be up to 4 gigabytes in size. Addressing of the Ethernet terminals can be in any order because the data sequence is independent of the physical order. Broadcast, Multicast and communication between slaves are possible. Transfer directly in the Ethernet frame is used in cases where EtherCAT components are operated in the same subnet as the master controller and where the control software has direct access to the Ethernet controller. Wiring flexibility in EtherCAT is further maximized through the choice of different cables. Flexible and inexpensive standard Ethernet patch cables transfer the signals optionally in Ethernet mode (100BASE-TX) or in E-Bus (LVDS) signal representation. Plastic optical fiber (POF) can be used in special applications for longer distances. The complete bandwidth of the Ethernet network, such as different fiber optics and copper cables, can be used in combination with switches or media converters. Fast Ethernet (100BASE-FX) or E-Bus can be selected based on distance requirements. The Fast Ethernet physics enables a cable length of 100 m between devices while the E-Bus line is intended for modular devices. The size of the network is almost unlimited since up to 65535 devices can be connected.

Further, such an embodiment using EtherCAT supports an approach for synchronization with accurate alignment of distributed clocks, as described in the IEEE 1588 standard. In contrast to fully synchronous communication, where synchronization quality suffers immediately in the event of a communication fault, distributed aligned clocks have a high degree of tolerance from possible fault-related delays within the communication system.

Thus, data exchange is completely hardware based on "mother" and "daughter" clocks. Each clock can simply and accurately determine the other clocks run-time offset because the communication utilizes a logical and full-duplex Ethernet physical ring structure. The distributed clocks are adjusted based on this value, which means that a very precise network-wide time base with a jitter of significantly less than 1 microsecond is available.

However, high-resolution distributed clocks are not only used for synchronization, but can also provide accurate information about the local timing of the data acquisition. For example, controls frequently calculate velocities from sequentially measured positions. Particularly with very short sampling times, even a small temporal jitter in the displacement measurement leads to large step changes in velocity. In an embodiment comprising EtherCAT, the EtherCAT expanded data types (timestamp data type, oversampling data type) are introduced. The local time is linked to the measured value with a resolution of up to 10 ns, which is made possible by the large bandwidth offered by Ethernet. The accuracy of a velocity calculation then no longer depends on the jitter of the communication system. It is orders of magnitude better than that of measuring techniques based on jitter-free communication.

Finally, in an embodiment where network 620 comprises EtherCAT, a hot connect function enables parts of the network to be linked and decoupled or reconfigured "on the fly". Many applications require a change in I/O configuration during operation. The protocol structure of the EtherCAT system takes account of these changing configurations.

As described in FIG. 6*a*, network 620 then interfaces with individual devices and actors via control data interface 650. Control data interface is part of network 620, or may comprise distributed components at the input of individual actors. Additionally, Input and feedback data interface is the same device as control data interface, acting as an opposite direction data flow of the same device interfacing with network 620. The actors interfacing with network 620 comprise camera control 632, secondary control 634, audio 636, digital output bank 648, camera robot 670, follow focus 672, light 674, master input 650, and master safety control 690.

In certain embodiments, some actors may communicate directly to network 620 via control data interface 650. For example, in the embodiment described above where network 620 is an EtherCAT network, camera control 632, secondary control 634, audio 636, and digital output bank 648 is able to communicate with no adapter through network 620. In such an embodiment, adapter 662*a* is an EtherCAT-provibus adapter for communicating with camera robot 670, adapter 662*b* is an EtherCAT-preston adapter for communicating with follow focus 672, and adapter 662*c* is an EtherCAT-dmx adapter for controlling light 674.

In addition to master control 610 and the devices communicating with master control 610 via network 620, motion control system 600 may comprise a plurality of other input, feedback, and devices such as OS network 654, database 622, database interface 652, MI display 656, software control 657, video output 658, and adapters 655*a-c*. In one potential embodiment, OS network 654 is an Ethernet network coupled to master control 610. MI display 656 may function as a display for master input 650 in a manner similar to the display described for master input 524 of FIG. 5*a*. Software control 657 may function as a software environment that may virtually create a global timeline for use with master control 610, and may also function to create a global timeline in real-time with live control of device actors. In one embodiment, software control 657 is a software program such as MAYA™ with supporting software add-ons. Finally, video output 658 is a real time video output associated with a camera in motion control system 600. As motion control system moves through a global timeline, video output may allow real time video review of a motion controlled set, such that individual device actors is modified, or a master input 650 controls is adjusted based on information from video output 658.

Figure 6B:
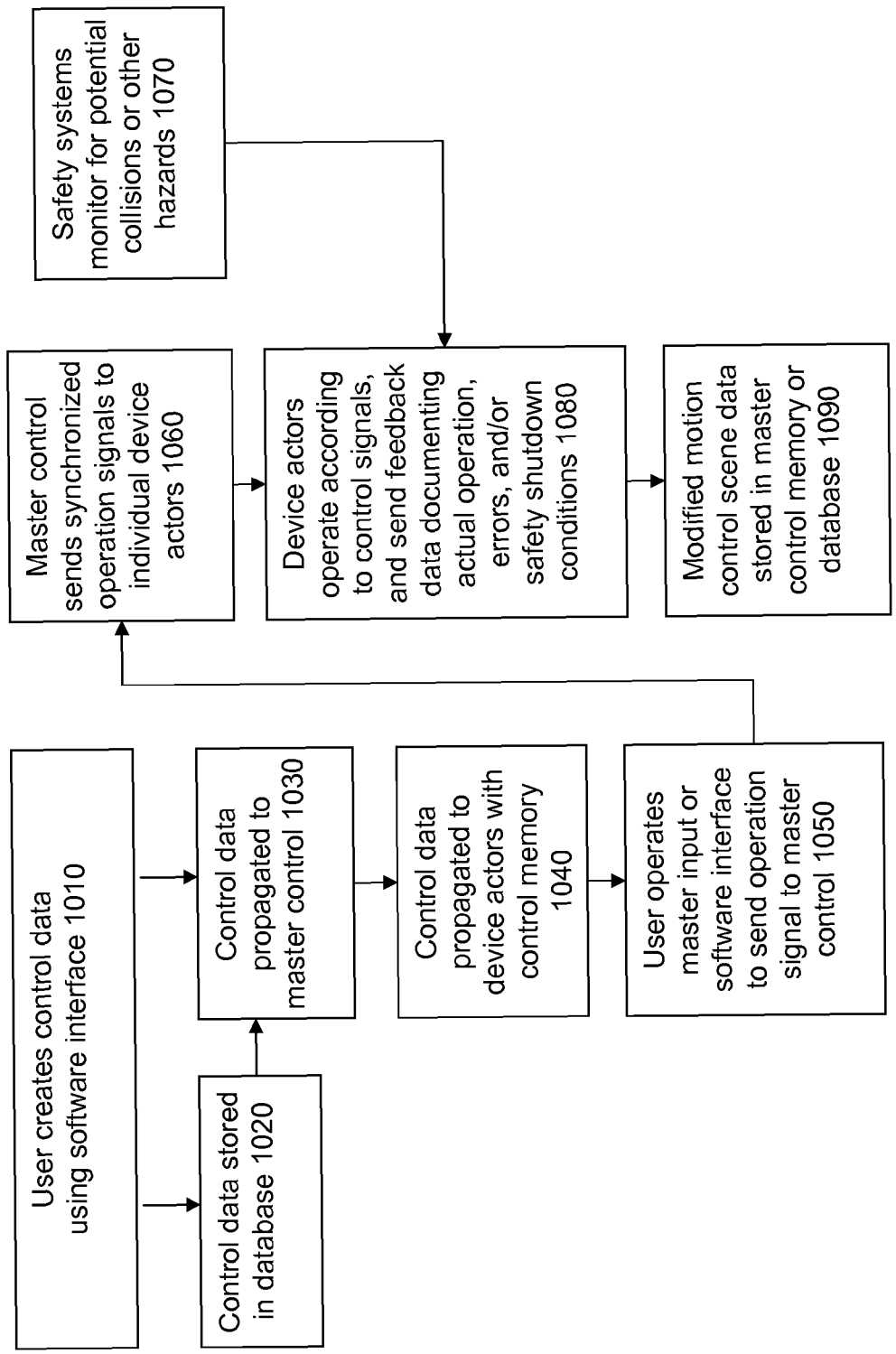
FIG. 6b illustrates a method of control according to one embodiment of the innovations presented herein.

Motion control system 600 of FIG. 6*a* may then allow for function and creation of media in a variety of different ways, and described by FIG. 6*b*. In an embodiment described by FIG. 6*b*, a user may create control data using a software interface such as software control 657. The control data may then be stored in database 622 for future use. Alternatively or concurrently, the control data is sent to master control 610. The master control then manages control logic 696 and creates a global timeline, such that any data required by specific devices prior to function is communicated to those devices. For example, in one potential embodiment, camera robot 670 must have all position data prior to operation, with camera robot 670 functioning in synchronization with the global timeline by receiving a time or frame input and acting in response using previously received control information to move to the correct position for the current state of the global timeline. After the global timeline is prepared by master control 610, and all device actors are prepared, a user may use a master input 650 or a software control 657 to send an operation signal to master control 610. The master control then sends the appropriate control signals to individual device actors given the global timeline position and synchronization. The device actors then operate according to control signals, and send feedback signals via network 620 documenting actual operation, errors, and/or safety shutdown conditions. The feedback data can then be used to update the control signal managed by master control 610 to modify or match the original control data from the database 622 or software control 657.

In one potential embodiment, motion control system 600 comprises master safety control 690. Master safety control may comprise a hard wired shut down control connected directly to device actors identified as posing a safety risk. Such a shutdown control is attached to master input 650. In another potential embodiment, master safety control 690 comprises a safety computing system or a safety PLC attached to safety sensors. Such safety sensors may comprise object proximity detectors attached to a device actor. When a scene is created in motion control system 600, the scene will have data for expected device actors and for players appearing in the scene. Object proximity detectors is programmed or coupled to a computing system to filter expected objects with expected locations from unexpected objects and locations. If an object is detected by an object proximity detector in an unexpected and unsafe location, a signal is sent to shut down the entire motion controlled scene, or at a minimum, device actors determined to pose a potential danger to the unexpected object. In another potential embodiment, boundaries for a motion controlled scene are determined. Proximity detectors or motion detectors is configured to detect movement across a scene boundary or a device actor boundary during operation of the motion control system, and to halt operation when an unsafe motion or object is detected. In this fashion, master safety control may observes an area proximate to various device actors and transmit a safety shutdown signal. In one potential embodiment, an object detector comprises a light detection and ranging unit (LIDAR). In another potential embodiment, the object detector is a passive infrared sensor (PIR).

Figure 7:
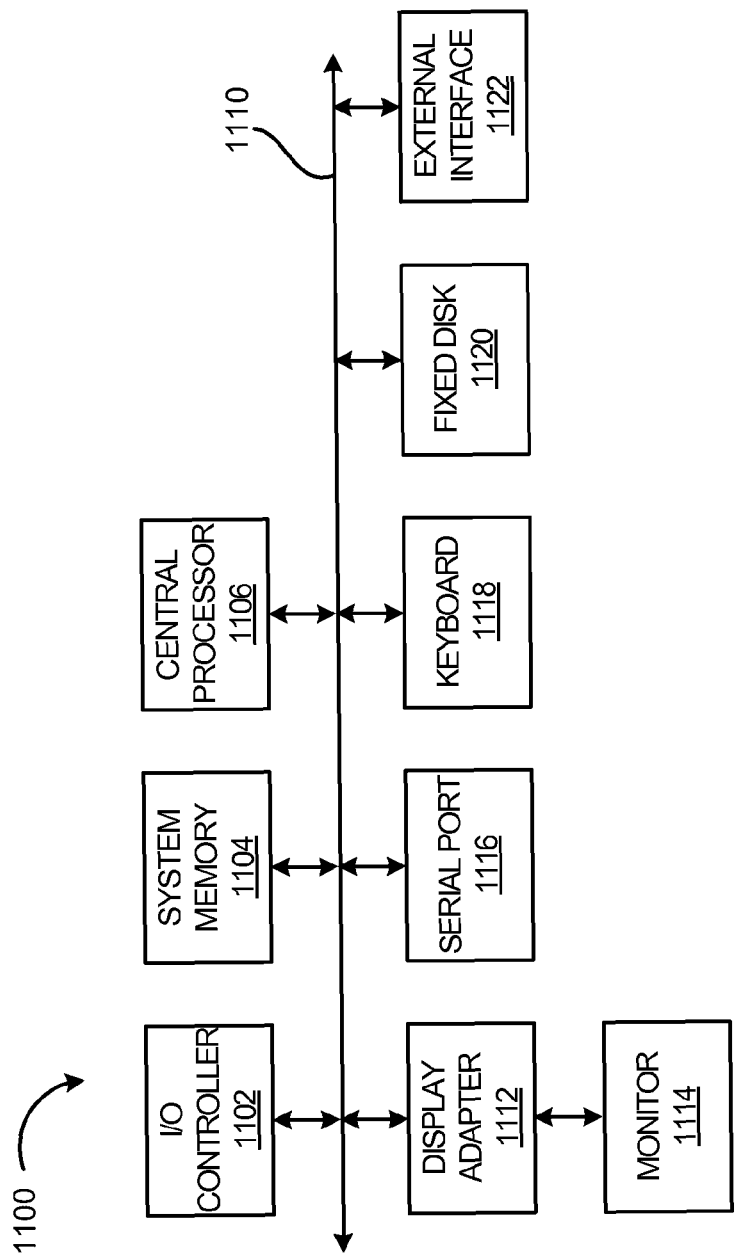
FIG. 7 shows one potential implementation of a computer or electronic device in accordance with various embodiments of the present innovations.

FIG. 7 shows a block diagram of an exemplary computer apparatus that can be used in some embodiments of the invention (e.g., in the components shown in the prior Figures).

The subsystems shown in FIG. 7 are interconnected via a system bus 710. Additional subsystems such as a printer 708, keyboard 718, fixed disk 720 (or other memory comprising computer readable media), monitor 714, which is coupled to display adapter 712, and others are shown. Peripherals and input/output (I/O) devices, which couple to I/O controller 702, can be connected to the computer system by any number of means known in the art, such as through serial port 716. For example, serial port 716 or external interface 722 can be used to connect the computer apparatus to a wide area network such as the Internet, a mouse input device, or a scanner. The interconnection via system bus 710 allows the central processor 706 to communicate with each subsystem and to control the execution of instructions from system memory 704 or the fixed disk 720, as well as the exchange of information between subsystems. The system memory 704 and/or the fixed disk 720 may embody a computer readable medium.

Figure 8:
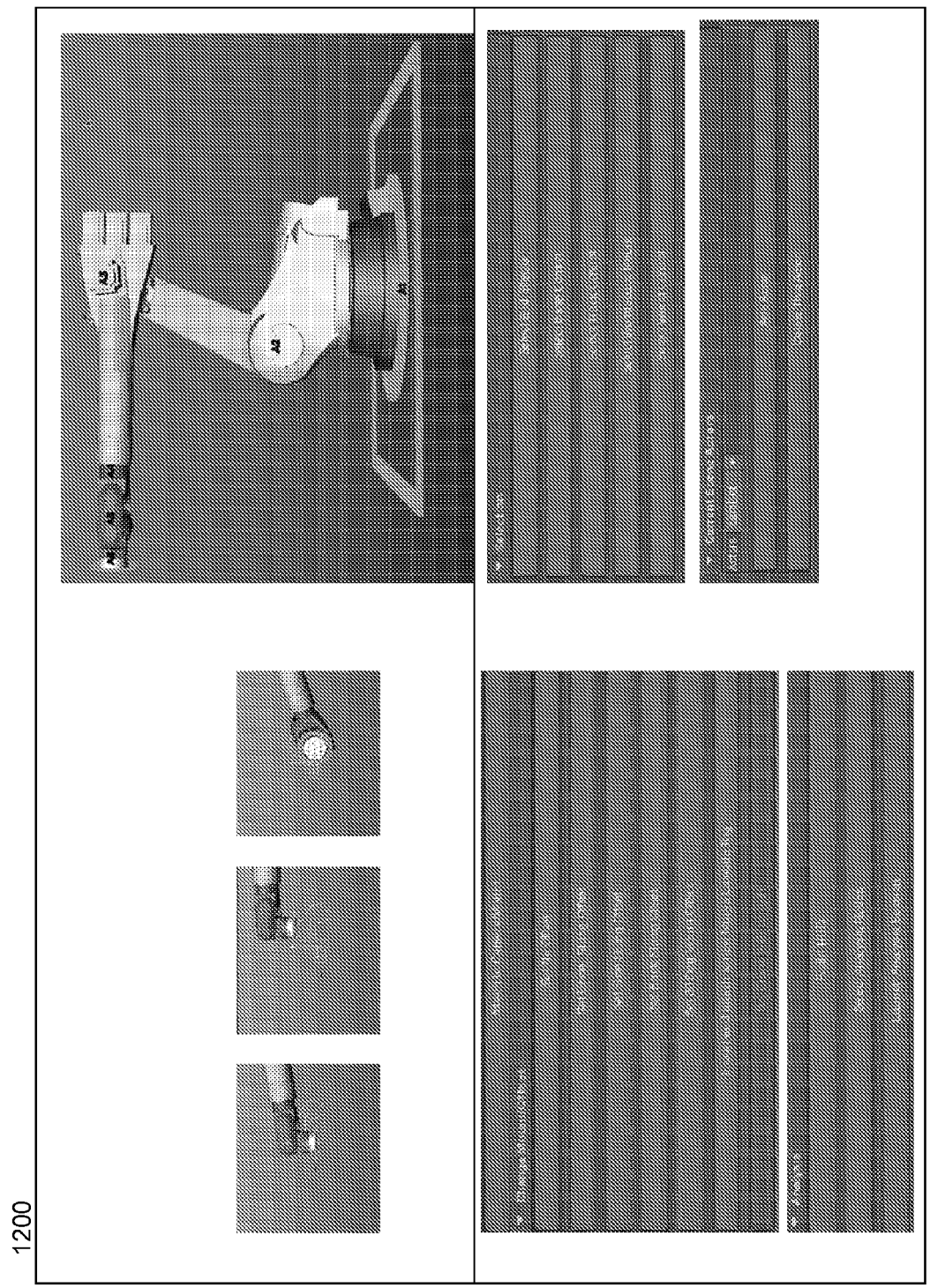
FIG. 8 illustrates a potential user interface for a software control according to one embodiment of the innovations herein.

FIG. 8 illustrates one potential embodiment of a user interface 1200 in a software control for use with a motion control photography system. Such an interface may enable a number of functions, including modeling of individual device actors, software control of individual device actors, creation of control data for individual device actors, and recording control or operation data for individual device actors. Similarly multiple devices is modeled simultaneously to model, control, or record operation of an entire motion controlled set using an interface such as user interface 1200.

User interface 1200 may include an actor panel with a plurality of interface buttons including an "actors" drop down menu to show a list of the current device actors is a scene, and "add actor" scene to bring up a prompt which allows selections of a name and/or type of device actor to be created or added to a scene, and a "delete actor" interface to allow deletion of an actor from a scene.

User interface 1200 may also include a selection panel. A selection panel may include an interface for "Select End Effector" which selects a controller on the robot which allows the user to drive the robot via a wrist. This controller, when selected and viewed through channel box editor, may house additional attributes that the user can control. These attributes may include:

Visibility—Toggles the visibility of the controller in a view port.
Disable Heads up Display (HUD) Updates—Disables all HUD updates in a view port.
A(1-6) Angle—Displays the current angle of each respective robot axis.
Track Robot (TR) Position—Displays the position of robot on the track axis.
Show Axes—Toggles the visibility of a skeleton in a view port.
FK IK (A1-A6)—Allows the switching settings for of individual joints.

A selection panel may also include a "select base control" interface which may select a controller on the robot which allows the user to position the robot from the base. Such a controller may, when selected and viewed through the channel box editor, houses additional attributes that the user can manipulate such as:

Translate Z—Moves the base along the track system.
Rotate Y—Changes the orientation of the base.
Column Height—Changes the base height of the robot.

A selection panel may also include additional interface controls such as:

Select Track Control—Selects a controller on the robot which allows the user to move and orient the track system to their liking. further describe the disconnect between the end effector and this node.
Select Worldspace Mount—Selects a controller for adding a mount.
Select World Controls—Selects a master controller which allows the user to move and orient the entire robot and track system together.

Additionally, user interface 1200 may provide controls for adding and removing mounts to device actors within the software system, and for setting placement for mounts that are added to device actors. For example, FIG. 8 shows three potential positions for mounting a camera to a robot arm that is a device actor in the current system. The user interface 1200 may provide graphical or number input selections for choosing between various mounting options, and for adjusting the position variables associated with such a setting.

In one potential embodiment of a motion control photography system, user interface 1200 is integrated through a software control to a camera robot such as software control 657 and camera robot 670 of FIG. 6a to enable an automated system calibration. One potential such calibration comprises a lens node calculation for determining a calibrated lens position in a camera mounted to a robot arm. One potential embodiment of such a calibration comprises providing software control 657 with information regarding the location and dimensions of a base, wrist or joint elements, and camera mounts for camera robot 670. A calibration player with known characteristics such as location and size is also provided. When a calibrate command is selected via software control 657, camera robot 670 records a plurality of images of the calibration player from different camera angles or locations. The images in conjunction with known data regarding the calibration player and camera robot 670 allows the lense node of the currently mounted camera to be calculated and incorporated into the device actor modeled in software control 657.

In an alternative embodiment of a calibration, software interface 1200 may have a calibration command for altering size or location data in response to feedback from a temperature sensor. For example, software control 657 is receive data via digital output bank 658 from a temperature sensor attached to a rail that is part of camera robot 670. Software control 657 is configured to adjust command signals due to known changes in rail characteristics over temperature, or is configured to signal a need to measure changes in device actor locations in response to temperature changes.

Figure 9:
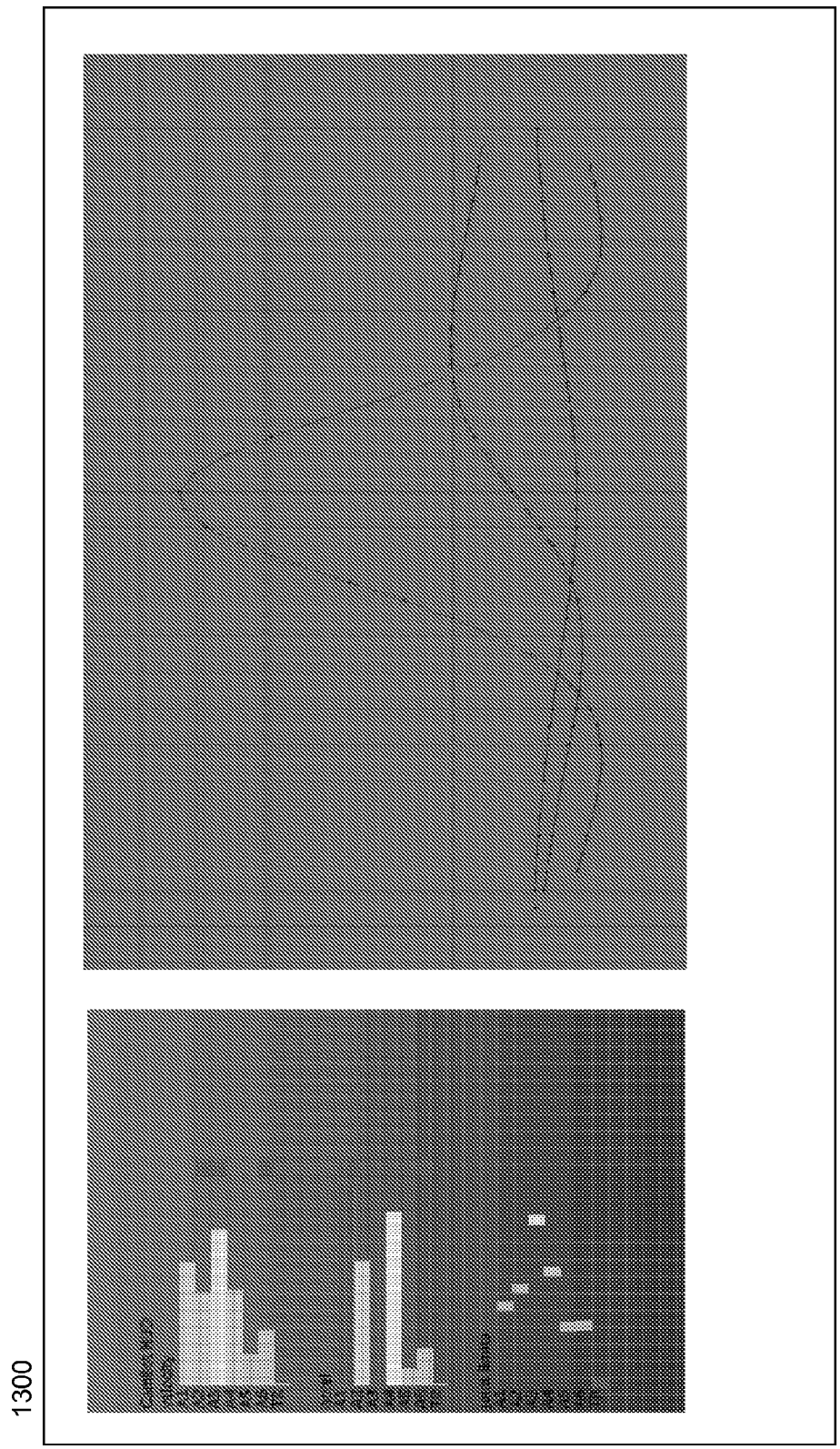
FIG. 9 illustrates a potential user interface for a software control according to one embodiment of the innovations herein.

A software control such as software control 26 of FIG. 1 or software control 657 of FIG. 6a may also comprise an analysis interface such as analysis interface 1300 of FIG. 9. Analysis interface 1300 shows movement data for individual axis of a device actor. Data such as current velocity and current acceleration is displayed, along with graphs of these characteristics over time through a scene, maximum allowable limits for each characteristic, and maximum achieved value for each characteristic. The values presented in analysis interface 1300 are modeled from a global timeline created within a software control or recorded in a database. The values may also be values recorded from the actual physical motion of device actors playing through a scene. Use of such analysis data may provide for modifications to be made to a scene while quickly verifying that safe limits of device actor function are not mistakenly exceeded.

In addition to analysis of operation of individual device actors, software control is used for preventative safety in detecting potential collisions between device actors in modeling the motion of the actors through a global timeline. Further, such modeling of a scene through a global timeline is used to set safety parameters for a safety system such as master safety control 690 of FIG. 6a. Modeling of locations and velocities of device actors through a global timeline may enable identification of unsafe zones and unsafe times in an area or set around a motion control system. Such an identification is used to set sensing triggers of object detectors that are part of the safety system described above. For example, if an area within 5 feet of a certain device actor is determined to be at risk of collision, and a buffer zone of 10 additional feet is required to insure safety during operation, a LIDAR detector is configured to detect unexpected objects and movement within a 15 foot area of the device actor during operation, and to automatically create a safety shutdown if an object is detected. In an alternative embodiment, the LIDAR detector is configured to create a warning signal if an object is detected in a periphery of the danger zone, and only to create a shutdown if the detected object is moving toward a potential impact zone.

In an alternate embodiment, a software control includes modeling of actors and models of defined safe zones. Analysis of the motion of the actors in software control allows a modeled safety check to see if any actor collides with a defined safe zone. Safe zones are defined by entry of fixed volumes of space into software control, by image capture of a set location. Safe zones may also be defined to be variable based on a detected motion, jerk, velocity, or acceleration of an object in a safe zone. In an alternate embodiment a safe zone is defined by input from transponder device data. For example, a transponder location device is attached to a player, and a safe zone defined by a distance from the transponder. The transponder feeds location data to software control, which may update safe zones within a software control or within a master safety control. In another embodiment, fixed safe zones are defined within software control, and published prior to a safety PLC within master safety control prior to operation of the motion controlled set.

Figure 10:
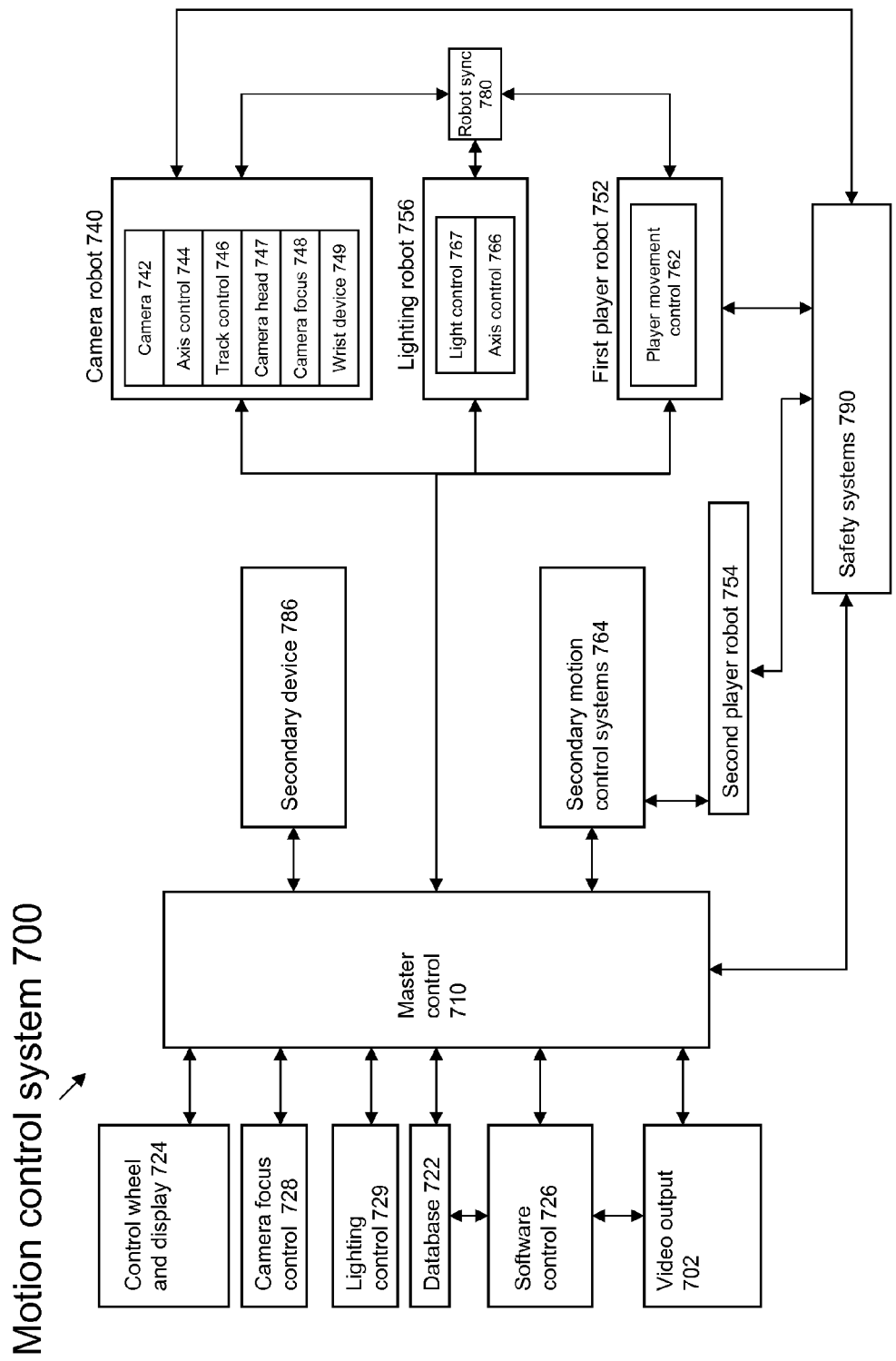
FIG. 10 shows a block diagram of a motion control photography system including a master scene control according to one embodiment of the innovations herein.

FIG. 10 describes an alternate embodiment of a motion control system according to the present innovations. The function of and operation of motion control system 700 is understood in conjunction with the detailed description of motion control systems described above.

The previous description of the embodiments is provided to enable any person skilled in the art to practice the invention. The various modifications to these embodiments will be readily apparent to those skilled in the art, and the generic principles defined herein are applied to other embodiments without the use of inventive faculty. Thus, the present invention is not intended to be limited to the embodiments shown herein, but is to be accorded the widest scope consistent with the principles and novel features disclosed herein.

Embodiments of the invention are not limited to the above-described embodiments. For example, throughout the description, various examples of device actors and robots are presented for use in a motion control photography system The embodiments are not limited to the general or specific examples provided herein, but may include other embodiments apparent to a person of ordinary skill in the art from the above descriptions. By further example, the above description provides an illustration of three modes selectable as input modes for a master input. The embodiments of the invention are not limited to these modes, but additional modes is used that may differ from the modes presented.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software.

Any of the software components or functions described in this application, is implemented as software code to be executed by a processor using any suitable computer language such as, for example, Java, C, or Perl using, for example, conventional or object-oriented techniques. The software code is stored as a series of instructions, or commands on a computer readable medium, such as a random access memory (RAM), a read only memory (ROM), a magnetic medium such as a hard-drive or a floppy disk, or an optical medium such as a CDROM. Any such computer readable medium may reside on or within a single computational apparatus, and is present on or within different computational apparatuses within a system or network.

The above description is illustrative and is not restrictive. Many variations of the invention will become apparent to those skilled in the art upon review of the disclosure. The scope of the invention should, therefore, be determined not solely with reference to the above description, but instead should be determined with reference to the pending claims along with their full scope or equivalents.

One or more features from any embodiment is combined with one or more features of any other embodiment without departing from the scope of the invention. For the purposes of the present application, a recitation of "a", "an" or "the" is intended to mean "one or more" unless specifically indicated to the contrary. Descriptions of alternative embodiments recite that certain portions of an embodiment "may" be present in the specific alternative embodiment being described, and that certain embodiments include the described element.

In addition to the above described embodiments, certain implementations involve motion control combined with 3D projection mapping. In 3D projection mapping, a viewer is presented with the visual projection an environment that is not actually physically present, when light is projected on a surface that is rendered from a specific perspective.

In 3D projection mapping, the knowledge of the physical spatial dimensions and coordinates of the projection surface or object is necessary to achieve the desired effect. Traditionally, these dimensions/location are stationary, and are therefore not varying.

In one potential embodiment according to the present innovations, the projection surface is in motion through a volume. Specifically the surface is moved via robotic (servo) actuation whereby the exact physical location of the projection surface is known to the system. In addition to the concept of moving the projection surface via a controlled method, embodiments also include movement of the projector via a controlled method to known coordinates. This might serve for example to provide an accurate representation from a correctly rendered perspective to a viewer that is on a motion platform (i.e., a passenger car on a ride or exhibit).

By placing a projection surface on the end effector of a robotic platform or arm, certain embodiments of the system are able to move the projection surface or object to a specific known coordinate in x,y,z (Cartesian) space. Since the exact location of the object is known (through robot encoder feedback, as well as programmed position), we are able to project imagery on the surface through mapping in 3D (virtual) space (in real-time).

Embodiments of the system thus create this effect in a traditional 3D projection mapping methodology whereby we create a 3D model (virtual) representation of the projection surface/object to calculate the proper render considering point of view and perspective. This render is then projected as light onto the object.

Such a system is incorporated with any of the above described software control or master control systems to create an audiovisual presentation that is controlled, programmed, and modified to enable improved editing and creation of 3D projection mapped audiovisual presentations that are integrated with lighting, safety, and software systems described above.

Figure 11:
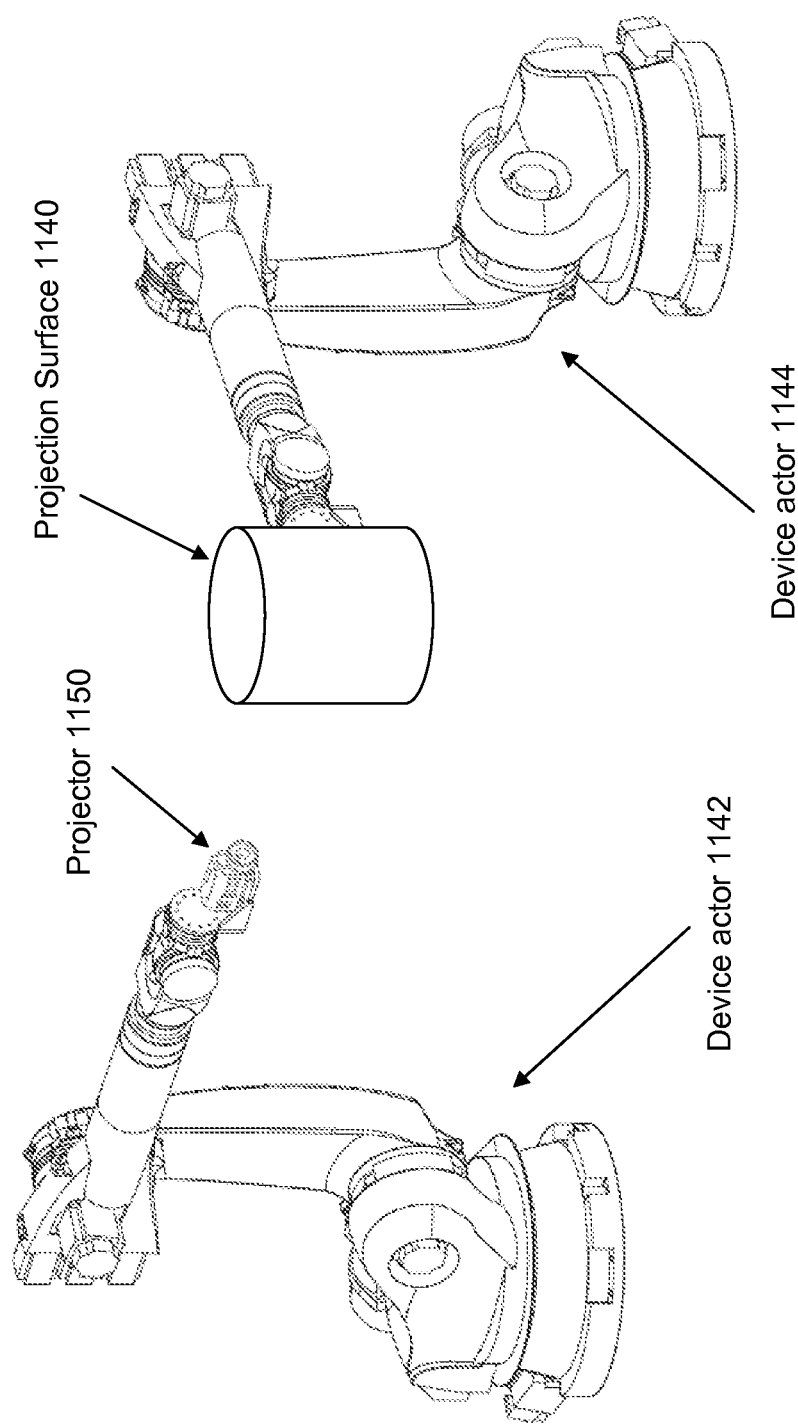
FIG. 11 shows one potential implementation of a system including 3D projection mapping.

FIG. 11 describes one potential embodiment of a 3D projection mapped audiovisual presentation system. FIG. 11 shows device actor 1142, projector 1150 mounted on device actor 1142, device actor 1144, and projection surface 1140 mounted on device actor 1144. Projector 1150 may receive or include signal information for projecting an image onto projection surface 1140 as projection surface 1140 is moved through a set of spatial coordinates by device actor 1144. In alternative embodiments, both device actors 1142 and 1144 is moving through spatial coordinates, or only device actor 1142 is moving. The spatial coordinates is provided by a master control system, a computer, or any other known means for controlling a device actor. As part of the system, the image projected onto the surface 1140 is created based on the known information of the movement of the device actor 1144 through the set of spatial coordinates.

For example, device actors 1142 and 1144 is coupled to a software control system such as software control 26 of FIG. 1 or software control 726 with video output 702 of motion control system 700. The system has imbedded information related to the projection surface 1140 and a desired visual representation. A manual control allows a user to manually adjust projection surface 1140's spatial position, and a software control is programmed to automatically adjust a graphical output from the projector to create the desired visual presentation. Alternately, a software control uses animation to describe a desired visual representation, and the software control automatically adjusts projector 1150 and projection surface 1140 using device actors 1142 and 1144 to create the desired audiovisual representation on projection surface 1140.

In one potential embodiment, and animation control system coupled to a projector projects an animation onto a projection surface. The animation control system includes an interface for modifying a 3D animation of the projection. The animation control system may include a relative coordinate representation of the projection surface and the current location of the projection surface based on control information received from a device actor that physically controls the location of the projection surface. The interface may thus enable modification of the animation within the relative coordinate system presented for the projection surface. As the projection surface is moved by a device actor, the animation control system receives a signal indicating this movement. The system then compensates based on any adjustment angle to create the appropriate presentation and perspective of the 3D projection. For example, as the projection surface angles away from a position normal to the projector, the projection is transformed to present a narrower output from the projector that will spread across the angled projector to maintain a constant image from the projection surface. The optical output power from the projector may similarly be increased to maintain a constant brightness from the projection surface. The output signal from the animation control system will automatically adjust the projection at the projector to maintain the animation at the appropriate location in the relative coordinate system on the projection surface. In one embodiment, multiple projectors may project the same 3D animation onto the projection surface at the same or alternating times. If the projection surface rotates such that a first projectors optical path to the projection surface is blocked, a second projector in a second location with an unblocked optical path may then project the same 3D animation onto the projection surface.

In additional embodiments, set models and movement of a set through a scene may further include modeling of an optical path from a projector to a projection surface. A master control or animation computer system that adjusts a set and scene movements may create an alert if changes to the set and scene create an obstruction of an optical path that would block part of the 3D projection and prevent presentation of the 3D projection at the projection surface.

Figure 12:
FIG. 12 shows one potential implementation of a projector in a system including 3D projection mapping.
Figure 13:
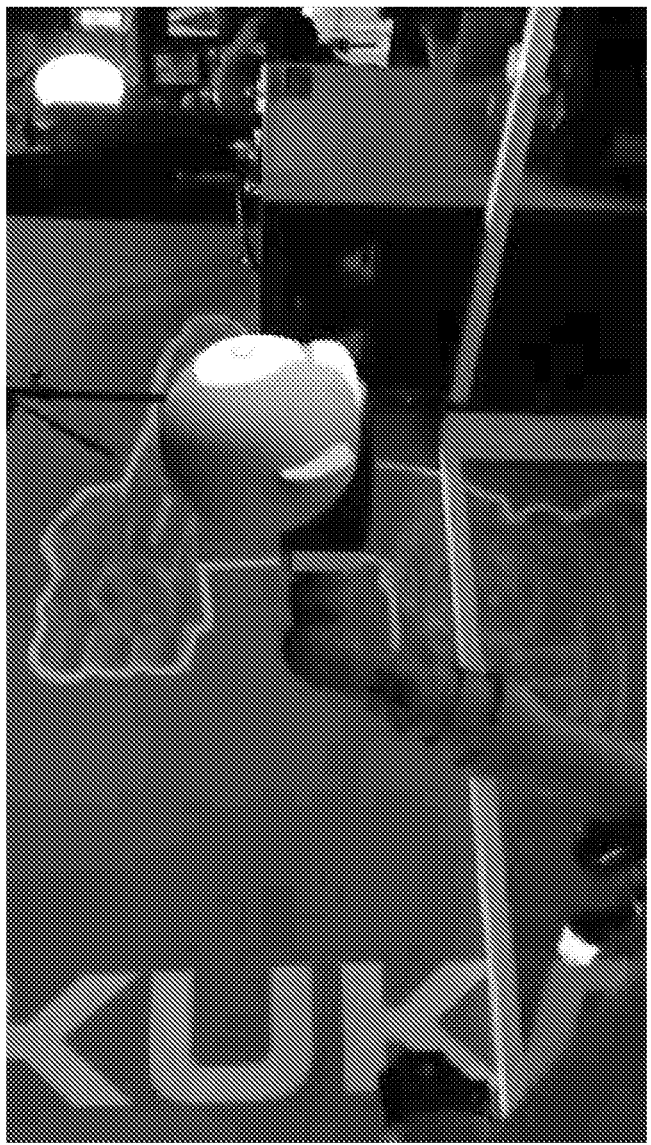
FIG. 13 shows one potential implementation of a system including 3D projection mapping.
Figure 14:
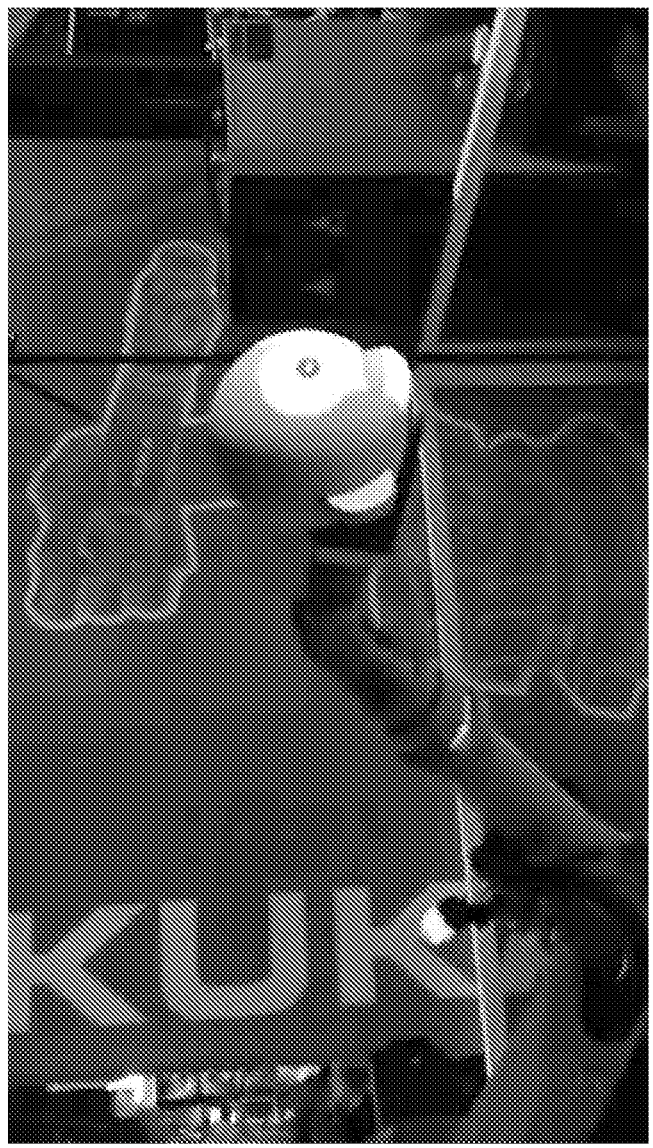
FIG. 14 shows one potential implementation of a system including 3D projection mapping.
Figure 15:
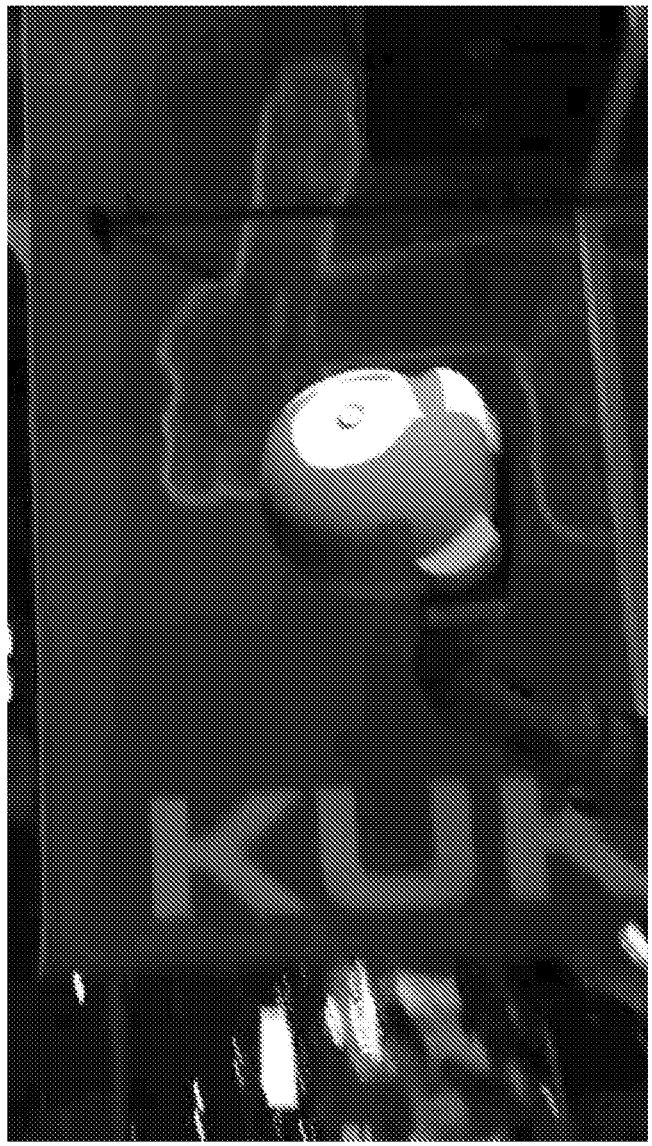
FIG. 15 shows one potential implementation of a system including 3D projection mapping.
Figure 16:
FIG. 16 shows one potential implementation of a system including 3D projection mapping.
Figure 16:
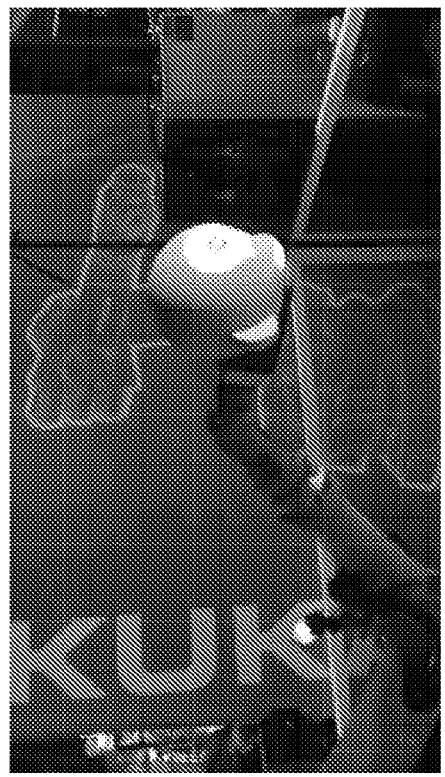
Figure 16:
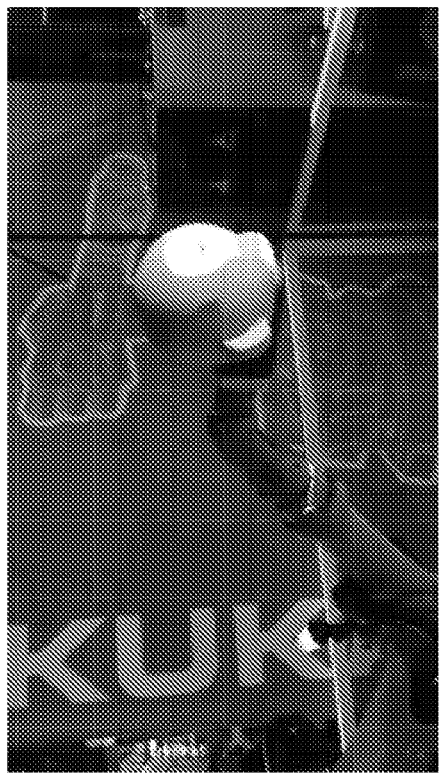
Figure 16:
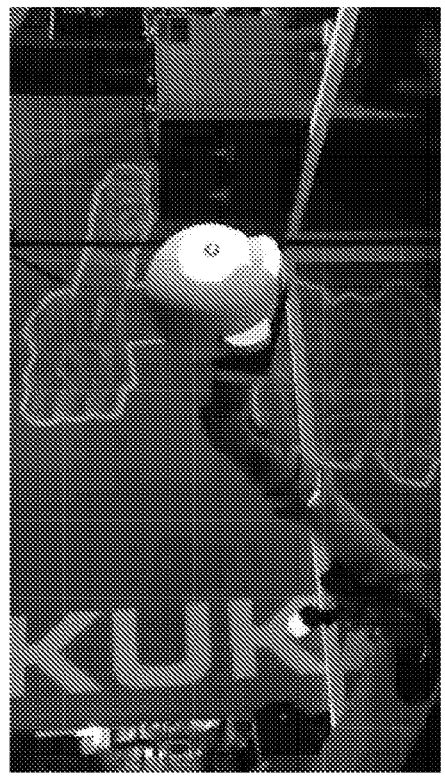
Figure 17:
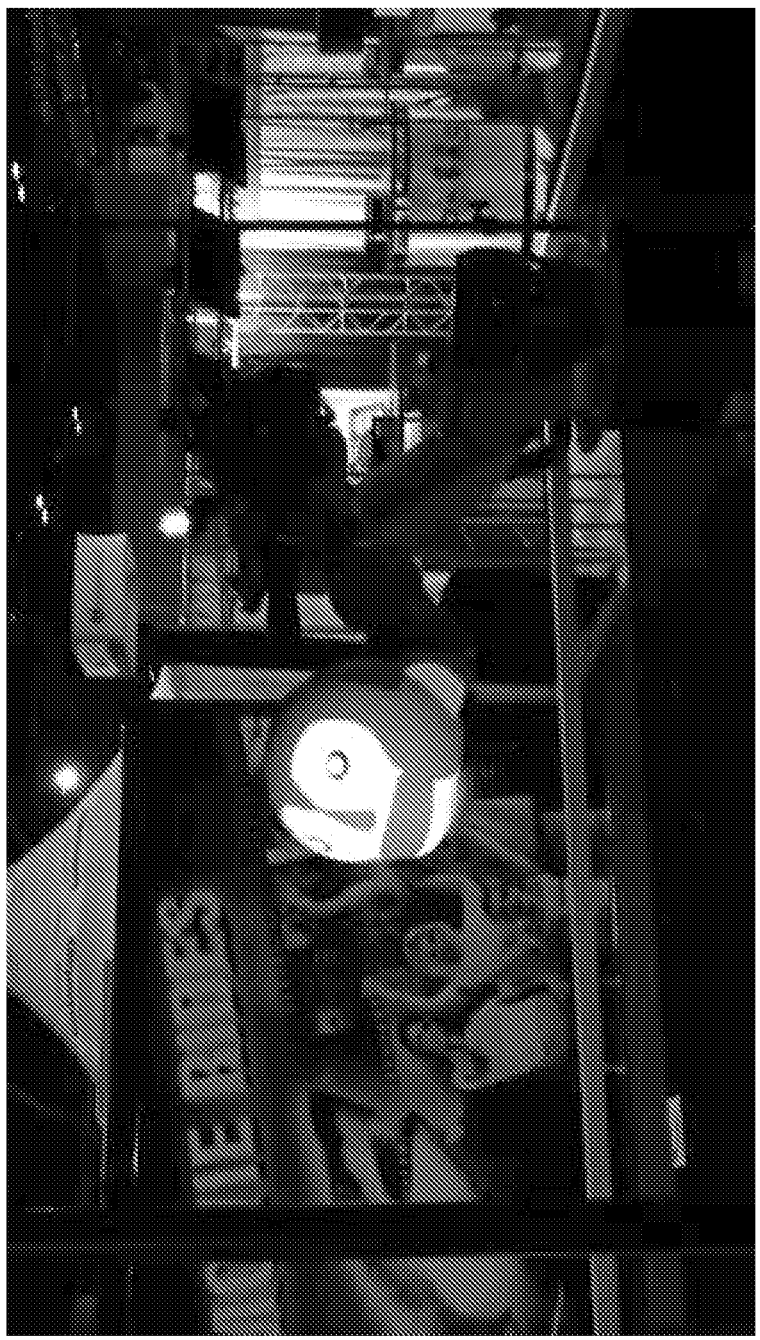
FIG. 17 shows one potential implementation of a system including 3D projection mapping.
Figure 18:
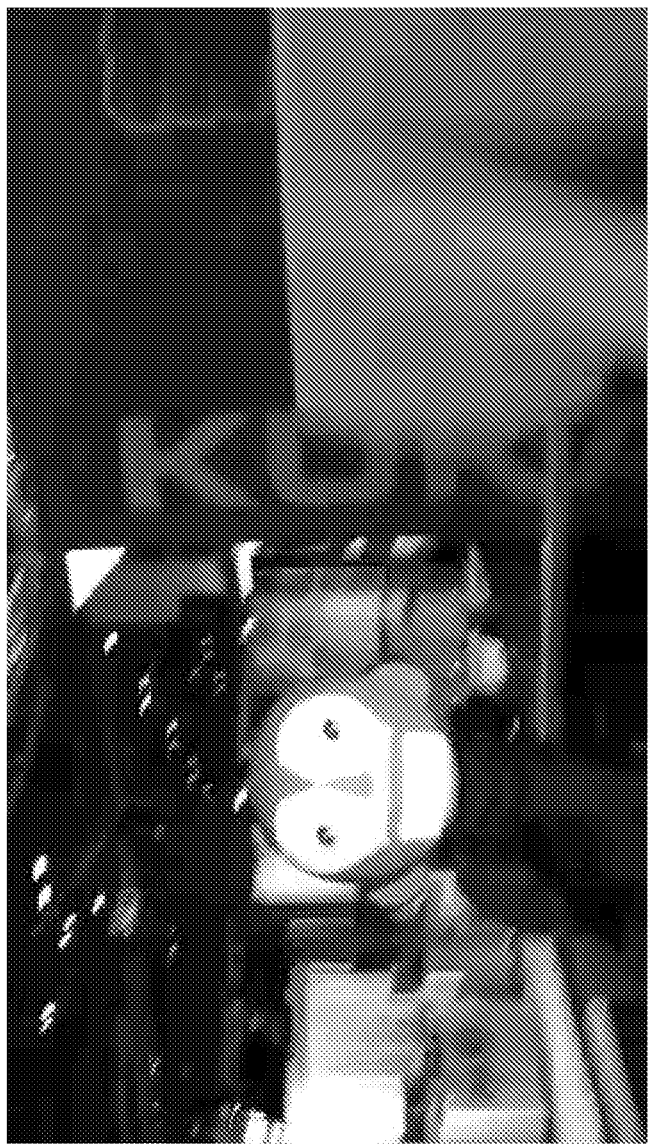
FIG. 18 shows one potential implementation of a system including 3D projection mapping.
Figure 19:
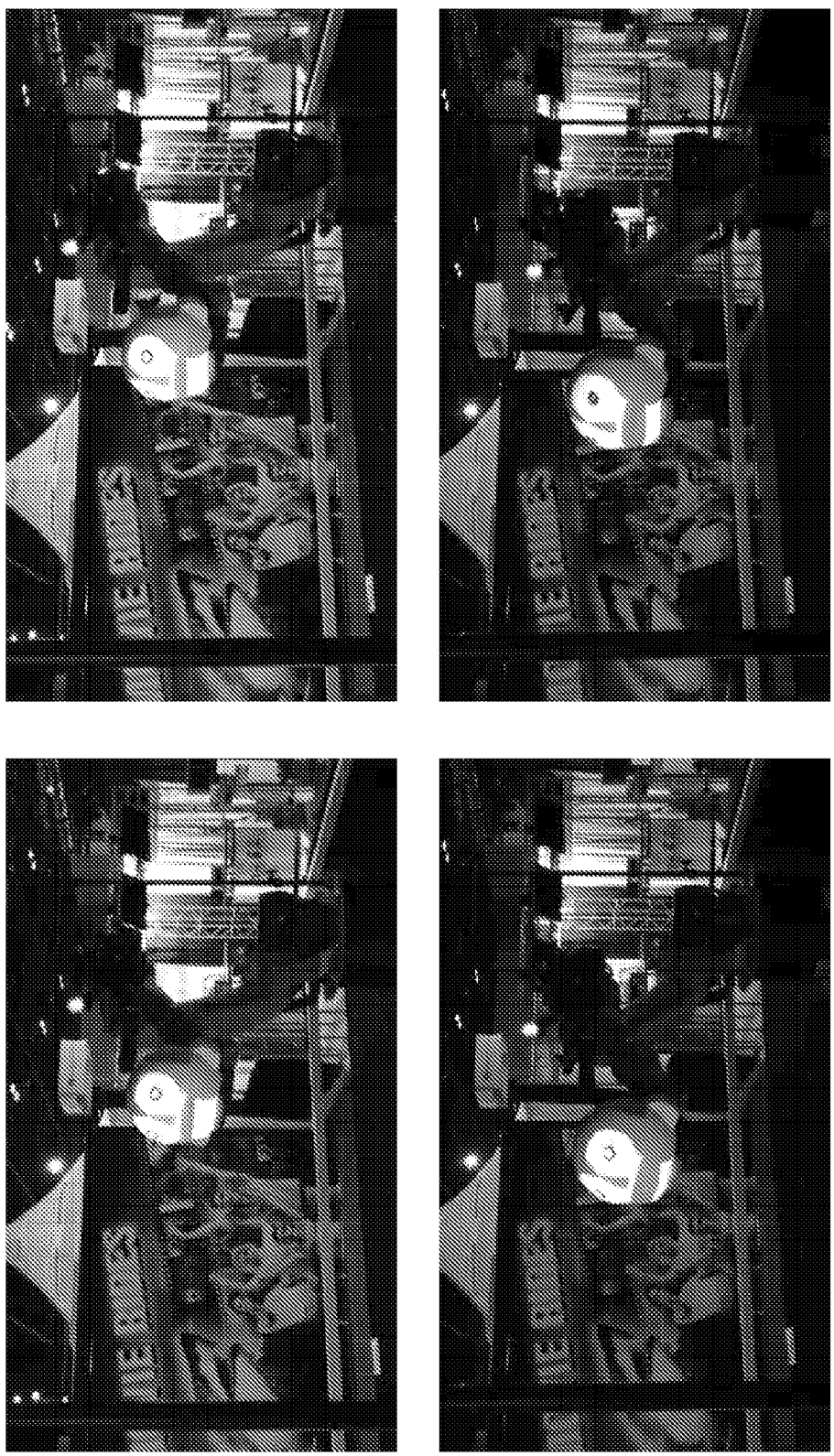
FIG. 19 shows one potential implementation of a system including 3D projection mapping.
Figure 20:
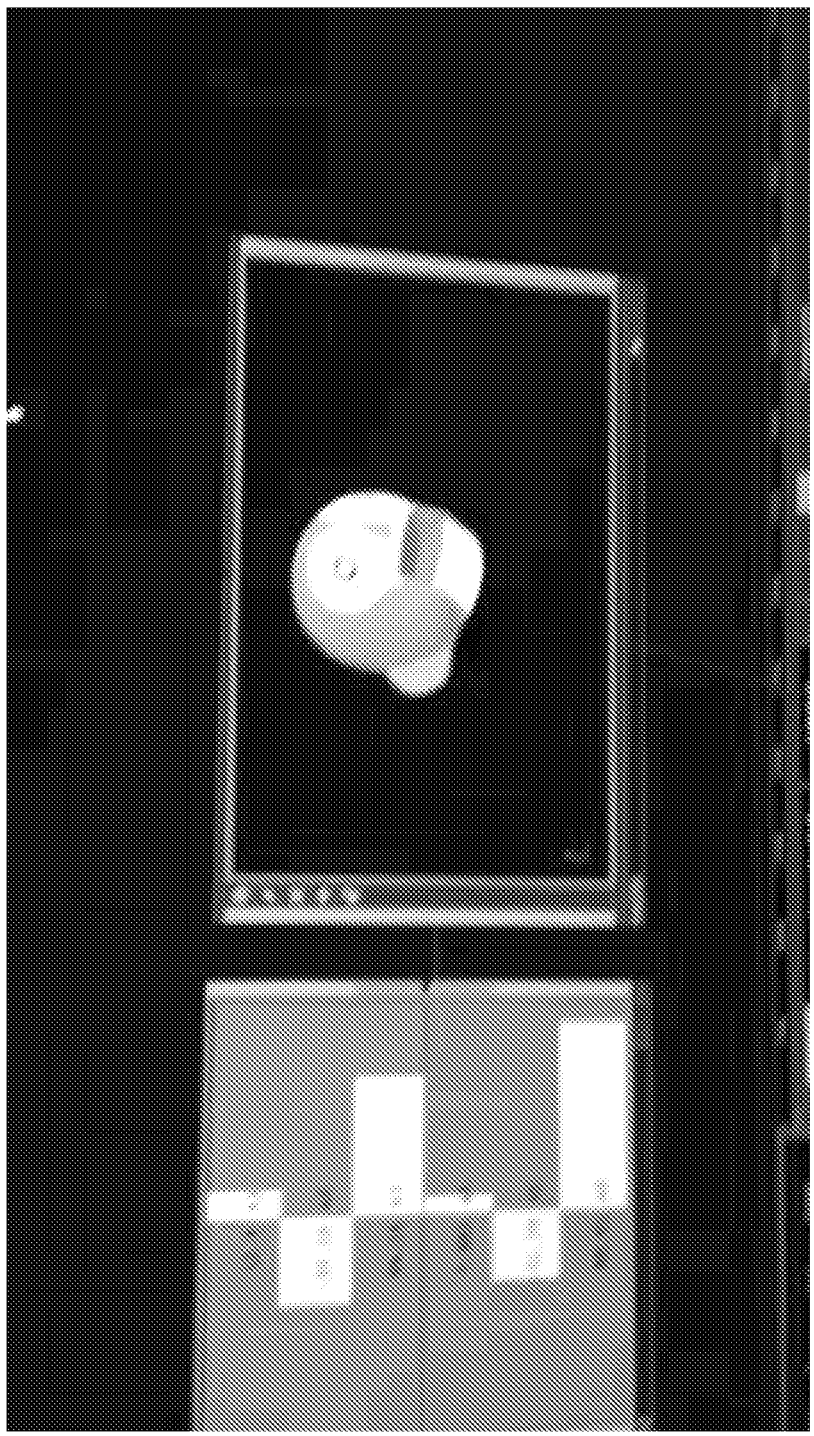
FIG. 20 shows one potential implementation of a user interface for a system including 3D projection mapping.
Figure 21:
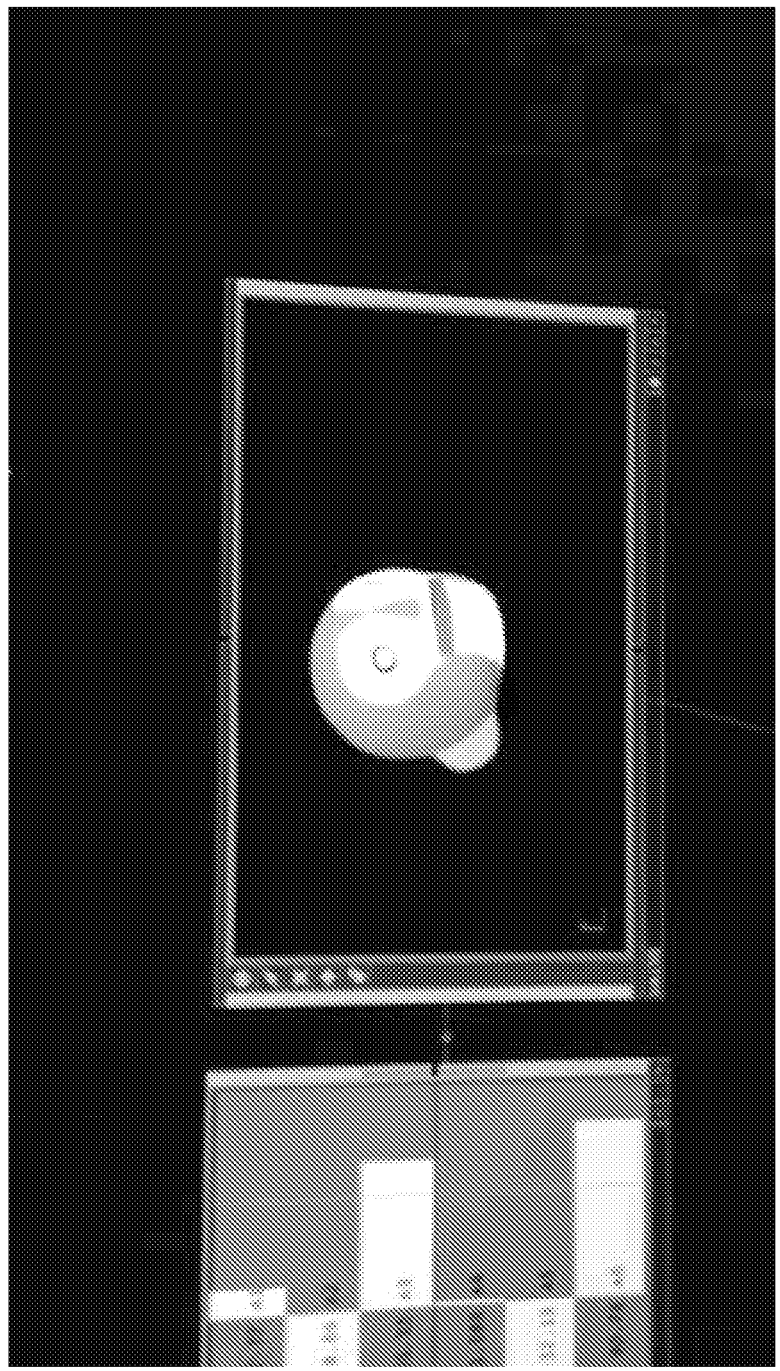
FIG. 21 shows one potential implementation of a user interface for a system including 3D projection mapping.

FIGS. 12-21 show additional details of potential implementations of a 3D motion control projection system in accordance with the present innovations. FIG. 12 shows one potential implementation of a 3D projection with projector 1150 projecting onto projection surface 1140. FIGS. 13-19 show one implementation of a projection surface 1140 mounted on a device actor 1144. In these figures, a roughly spherical projection object has a computer generated face projected onto the surface. This is an example of a projection. As the device actor moves the projection surface, the projected image of the face maintains an appropriate position on the projection surface, and the features of the face are animated to produce blinking eyes, a moving mouth, and other 3D animation on the moving projection surface. This may be matched to a set of coordinates associated with the projection surface. The projection surface 1140 is moved or translated through a set of coordinates, and the relative location of the face projection on projection surface 1140 may remain stable within a projection coordinate system on the projection surface as the projection surface is moved through the set of coordinates in space. This essentially presents the illusion of animation and mobility with the potential for extremely complex facial animation beyond what is possible using mechanical facial animation. FIGS. 20 and 21 show a computer model of the projection surface in a user interface 2010 in a display. The projection that operates concurrently with the motion of the device actor and the projection of the image onto the projection screen. The software may enable visualization and use of spatial information from the device actor, and adjustment or control of the projected image in real time or near real time.

In various embodiments, the projection surface is then be integrated with a scene as described above in the master control system. Movement of the entire scene is be matched to the timeline, and the animation of the 3D projection is additionally matched to the timeline, such that when manual or control system adjustments to the speed of the scene are made, the animation and movement of the 3D projection surface are also adjusted and matched to the movement of the entire scene. In one potential embodiment, a projection surface is a non-planar projection surface. In an alternate embodiment, the projection surface is a rear projection surface. In another alternate embodiment, a set includes a planar projection surface and a non-planar 3D projection surface.

In additional embodiments, the 3D computer animated projection is both part of a scene in a master control timeline, but also have certain portions of the animation matched to a real time input. For example, if a voice and spoken words from an actor are presented as coming from the animated device actor, the 3D projection of mouth movement is matched in real time to the words spoken by the human actor. Movement of the projection surface and certain parts of the 3D projection animation such as eye blinking is predetermined and automated, while projection of the mouth movement is specifically adapted to a human actor that is hidden from the audience.

In various embodiments, then a system for 3D projection with motion control comprises a projector; and a projection surface coupled to a first device actor, wherein the first device actor moves the projection surface through a set of spatial coordinates, and a 3D projection from the projector is projected onto a set of coordinates of the projection surface and matches the 3D projection to the set of coordinates of the projection surface as the projection surface moves through the set of spatial coordinates. Additional alternative embodiments comprise an animation computer system coupled to the projector that maps the 3D projection onto the projection surface and animates the 3D projection while matching the 3D projection to the set of coordinates of the projection surface as the non-planar projection surface moves through the set of spatial coordinates. In alternative embodiments, animation computer system is further coupled to the device actor, and the animation computer system provides the set of spatial coordinates to the device actor to instruct the device actor to move the non-planar projection surface through the set of spatial coordinates.

Additional alternative embodiments comprise a master control that receives a plurality of control signals comprising control data for a plurality of device actors including the first device actor and synchronizes the plurality of control signals with a global timeline to create a plurality of synchronized signals, such that control data for each actor of the device actors is associated with a corresponding position in the global timeline; and a master input that conveys a master input signal to the master control indicating a position in the global timeline and a rate of progression through the global timeline; wherein the master control responds to the master input signal by communicating the plurality of synchronized signals associated with the position in the global timeline to the plurality of device actors, and the control data for each actor of the device actors is sent to respective device actors at the rate of progression through the global timeline.

In additional alternative embodiments, the master input comprises an analog input, a mode selector, and an analog input action control; the analog input action control returns the analog input to a first position when no force is applied to the analog input; for a first selected mode of the master input, adjustment of the analog input in a first direction increases the rate of progress through the global timeline from a predetermined standard forward rate; for the first selected mode of the master input, adjustment of the analog input in a second direction different from the first direction decreases the rate of progress through the global timeline from the predetermined standard forward rate; for a second selected mode of the master input, adjustments to the analog input in the first direction creates a variable rate of progress in the forward direction from a stationary rate; and for the second selected mode of the master input, adjustments to the analog input in the second direction creates a variable rate of progress in a reverse direction from the stationary rate.

In additional alternative embodiments, the animation computer system comprises a real time input for modifying the 3D projection while maintaining the 3D projection within the set of coordinates of the projection surface as the projection surface moves through the set of spatial coordinates.

Additional alternative embodiments comprise an object detector that observes an area proximate to a first device actor of the plurality of device actors and transmits a safety shutdown signal to the first device actor when the object detector senses an object.

Additional alternative embodiments comprise a master safety control; wherein the master safety control comprises a programmable logic circuit; and wherein the safety shutdown signal is transmitted to each of the plurality of device actors via the programmable logic circuit.

In additional alternative embodiments, the first device actor is a robotic arm, the object detector is attached to a mounting point of the robotic arm, and wherein the area proximate to the first device actor comprises an area extending a fixed distance from the object detector.

In additional alternative embodiments, the area proximate to the first device actor varies over time in a predetermined manner determined in association with the position in the global timeline and the rate of progress through the global timeline.

Another alternative embodiment comprises a method for motion control. One embodiment of the method comprises moving a projection surface through a set of spatial coordinates using a first device actor coupled to the projection surface; projecting from a projection device using a signal from an animation computer, a 3D projection onto the projection surface; and mapping, using the animation computer, the 3D projection onto the projection surface to match a 3D projection movement with the movement of the projection surface through the set of spatial coordinates.

Additional alternative embodiments comprise receiving control data for a plurality of device actors including the first device actor at a master control; synchronizing a plurality of control signals, using the master control, with a global timeline to create a plurality of synchronized signals, such that the control data for each actor of the device actors is associated with a corresponding position in the global timeline; receiving, at the master control, a master input signal indicating a position in the global timeline and a rate of progression through the global timeline; and communicating, in response to the master input signal, the plurality of synchronized signals associated with the position in the global timeline from the master control to the plurality of device actors, wherein the plurality of synchronized signals are sent to the plurality of device actors at the rate of progression through the global timeline indicated by the master input signal.

Additional alternative embodiments comprise detecting, using at least one object detector, an area proximate to the plurality of device actors; and transmitting, from the at least one object detector, a safety shutdown signal that prevents the plurality of device actors from operating.

Additional alternative embodiments comprise methods where the rate of progress through the global timeline comprises a reverse rate of progress through the global timeline.

Additional alternative embodiments comprise receiving at the master control, during the communicating of the plurality of synchronized signals, a modifying control input for a first device actor of the plurality of device actors from an independent manual control; synchronizing the modifying control input with the plurality of synchronized signals to create an updated plurality of synchronized signals during the communication of the plurality of synchronized signals; and communicating the updated plurality of synchronized signals in place of the synchronized signals.

Additional alternative embodiments comprise storing the updated plurality of synchronized signals in a database, wherein the control data is received at the master control from the database.

Additional alternative embodiments comprise receiving at the master control, feedback data from the plurality of device actors describing an operating characteristic associated with the synchronized control signals; and modifying the synchronized control signals in response to the feedback data.

Additional alternative embodiments comprise adjusting in real time, the signal from the animation computer, to create a real time computer animation at the projection surface based on a user input at the animation computer.

Additional alternative embodiments comprise a computer readable medium storing instructions for execution by a computing system for implementing a method of creating a film using motion control, the method comprising: modeling physical characteristics and locations, using a software control comprising a computing device; for a plurality of device actors, at least one projector, and at least one projection surface in a motion control set; modeling movement characteristics and an optical path from the at least one projector to the at least one projection surface, using the software control, for the plurality of device actors in the motion control set to create control data for the plurality of device actors; analyzing the modeling of the movements, physical characteristics, and locations of the plurality of device actors, using the software control, to detect collisions, obstruction of the optical path, and to detect device actor motion that exceeds a set of predetermined operating limits; and communicating the control data to a master control that synchronizes the control data and transmits the control data to the plurality of device actors.

In additional alternative embodiments, the method further comprises analyzing the modeling of the movements, physical characteristics, and locations of the plurality of device actors, using the software control, to determine a set of locations proximate to the device actors that include a collision risk and transmitting the set of locations to a master safety control comprising at least one object detector.

What is claimed is:

1. A system for 3D projection with motion control comprising:
   a projection surface coupled to a first device actor, wherein the first device actor moves the projection surface through a set of spatial coordinates;
   a projector that is operable to project a 3D projection onto a set of coordinates of the projection surface; and
   an animation computer system that matches the 3D projection to the set of coordinates of the projection surface as the projection surface moves through the set of spatial coordinates, such that movement of the 3D projection matches movement of the projection surface during at least translational movement of the projection surface from a first location in the set of spatial coordinates to a second location in the set of spatial coordinates.

2. The system of claim 1,
   wherein the animation computer system is coupled to the projector that maps the 3D projection onto the projection surface and animates the 3D projection while matching the 3D projection to the set of coordinates of the projection surface as the non-planar projection surface moves through the set of spatial coordinates.

3. The system of claim 2 wherein the animation computer system is further coupled to the device actor, and the animation computer system provides the set of spatial coordinates to the device actor to instruct the device actor to move the non-planar projection surface through the set of spatial coordinates.

4. The system of claim 3 further comprising:
   a master control that receives a plurality of control signals comprising control data for a plurality of device actors including the first device actor and synchronizes the plurality of control signals with a global timeline to create a plurality of synchronized signals, such that control data for each actor of the device actors is associated with a corresponding position in the global timeline; and
   a master input that conveys a master input signal to the master control indicating a position in the global timeline and a rate of progression through the global timeline;
   wherein the master control responds to the master input signal by communicating the plurality of synchronized signals associated with the position in the global timeline to the plurality of device actors, and the control data for each actor of the device actors is sent to respective device actors at the rate of progression through the global timeline.

5. The system of claim 4 wherein the master input comprises an analog input, a mode selector, and an analog input action control;
   wherein the analog input action control returns the analog input to a first position when no force is applied to the analog input;
   wherein for a first selected mode of the master input, adjustment of the analog input in a first direction increases the rate of progress through the global timeline from a predetermined standard forward rate;
   wherein for the first selected mode of the master input, adjustment of the analog input in a second direction different from the first direction decreases the rate of progress through the global timeline from the predetermined standard forward rate;
   wherein for a second selected mode of the master input, adjustments to the analog input in the first direction creates a variable rate of progress in the forward direction from a stationary rate; and
   wherein for the second selected mode of the master input, adjustments to the analog input in the second direction creates a variable rate of progress in a reverse direction from the stationary rate.

6. The system of claim 5 wherein the animation computer system comprises a real time input for modifying the 30 projection while maintaining the 30 projection within the set of coordinates of the projection surface as the projection surface moves through the set of spatial coordinates.

7. The system of claim 4 further comprising an object detector that observes an area proximate to a first device actor of the plurality of device actors and transmits a safety shutdown signal to the first device actor when the object detector senses an object.

8. The system of claim 7 further comprising a master safety control;
   wherein the master safety control comprises a programmable logic circuit; and
   wherein the safety shutdown signal is transmitted to each of the plurality of device actor via the programmable logic circuit.

9. The system of claim 7 wherein the first device actor is a robotic arm, the object detector is attached to a mounting point of the robotic arm, and wherein the area proximate to the first device actor comprises an area extending a fixed distance from the object detector.

10. The system of claim 8 wherein the area proximate to the first device actor varies over time in a predetermined manner determined in association with the position in the global timeline and the rate of progress through the global timeline.

11. A method comprising:
    projecting from a projection device, a 3D projection onto a set of coordinates of a projection surface, wherein the projection surface is initially located at a first location in a set of spatial coordinates;

moving the projection surface through the set of spatial coordinates using a first device actor coupled to the projection surface, wherein the movement through the set of spatial coordinates comprises a translation of the projection surface from the first location in the set of spatial coordinates to a second location in the set of spatial coordinates; and mapping, using the animation computer, the 3D projection onto the projection surface to match movement of the 3D projection with the movement of the projection surface during the movement of the projection surface the set of spatial coordinates from the first location to the second location.

12. The method of claim 11 further comprising:
receiving control data for a plurality of device actors including the first device actor at a master control;
synchronizing a plurality of control signals, using the master control, with a global timeline to create a plurality of synchronized signals, such that the control data for each actor of the device actors is associated with a corresponding position in the global timeline;
receiving, at the master control, a master input signal indicating a position in the global timeline and a rate of progression through the global timeline; and
communicating, in response to the master input signal, the plurality of synchronized signals associated with the position in the global timeline from the master control to the plurality of device actors, wherein the plurality of synchronized signals are sent to the plurality of device actors at the rate of progression through the global timeline indicated by the master input signal.

13. The method of claim 12 further comprising:
detecting, using at least one object detector, an area proximate to the plurality of device actors; and
transmitting, from the at least one object detector, a safety shutdown signal that prevents the plurality of device actors from operating.

14. The method of claim 12 wherein the rate of progress through the global timeline comprises a reverse rate of progress through the global timeline.

15. The method of claim 12 further comprising:
receiving at the master control, during the communicating of the plurality of synchronized signals, a modifying control input for a first device actor of the plurality of device actors from an independent manual control;
synchronizing the modifying control input with the plurality of synchronized signals to create an updated plurality of synchronized signals during the communication of the plurality of synchronized signals; and
communicating the updated plurality of synchronized signals in place of the synchronized signals.

16. The method of claim 15 further comprising storing the updated plurality of synchronized signals in a database, wherein the control data is received at the master control from the database.

17. The method of claim 12 further comprising:
receiving at the master control, feedback data from the plurality of device actors describing an operating characteristic associated with the synchronized control signals; and
modifying the synchronized control signals in response to the feedback data.

18. The method of claim 11 further comprising:
adjusting in real time, the signal from the animation computer, to create a real time computer animation at the projection surface based on a user input at the animation computer.

19. A non-transitory computer readable medium storing instructions for execution by a computing system for implementing a method of creating a film using motion control, the method comprising:
modeling physical characteristics and locations, using a software control comprising a computing device; for a plurality of device actors, at least one projector, and at least one projection surface in a motion control set;
modeling movement characteristics and an optical path from the at least one projector to the at least one projection surface, using the software control, for the plurality of device actors in the motion control set to create control data for the plurality of device actors;
analyzing the modeling of the movements, physical characteristics, and locations of the plurality of device actors, using the software control, to detect collisions, obstruction of the optical path, and to detect device actor motion that exceeds a set of predetermined operating limits; and
communicating the control data to a master control that synchronizes the control data and transmits the control data to the plurality of device actors.

20. The non-transitory computer readable medium of claim 19, wherein the method further comprises:
analyzing the modeling of the movements, physical characteristics, and locations of the plurality of device actors, using the software control, to determine a set of locations proximate to the device actors that include a collision risk; and
transmitting the set of locations to a master safety control comprising at least one object detect.

* * * * *